United States Patent
van Dam et al.

(10) Patent No.: US 12,271,697 B2
(45) Date of Patent: Apr. 8, 2025

(54) INTENT-BASED SUGGESTION OF PHRASES IN A TEXT EDITOR

(71) Applicant: Grammarly, Inc., San Francisco, CA (US)

(72) Inventors: Jennifer van Dam, Vancouver (CA); Sergey Yavnyi, Richmond, CA (US); Xiaoshan Li, Campbell, CA (US); Masha Ivenskaya, San Francisco, CA (US); Jared Foelsch, San Francisco, CA (US)

(73) Assignee: Grammarly Inc., San Francisco, CA (US)

( * ) Notice: Subject to any disclaimer, the term of this patent is extended or adjusted under 35 U.S.C. 154(b) by 450 days.

(21) Appl. No.: 17/462,879

(22) Filed: Aug. 31, 2021

(65) Prior Publication Data
US 2023/0066233 A1    Mar. 2, 2023

(51) Int. Cl.
*G06F 40/289* (2020.01)
*G06F 16/35* (2019.01)
(Continued)

(52) U.S. Cl.
CPC ............ *G06F 40/289* (2020.01); *G06F 16/35* (2019.01); *G06F 40/205* (2020.01); *G06F 40/30* (2020.01)

(58) Field of Classification Search
CPC ...... G06F 40/289; G06F 40/205; G06F 40/30; G06F 16/35
See application file for complete search history.

(56) References Cited

U.S. PATENT DOCUMENTS

| | | | |
|---|---|---|---|
| 8,521,739 B1 * | 8/2013 | Pasca | G06F 16/9535 707/769 |
| 9,805,371 B1 * | 10/2017 | Sapoznik | G06N 3/088 |

(Continued)

FOREIGN PATENT DOCUMENTS

WO    2020220370 A1    11/2020

OTHER PUBLICATIONS

International Searching Authority, International Search Report and Written Opinion for International Application No. PCT/US2022/042046, mailed Mar. 23, 2023, 17 pages.

(Continued)

*Primary Examiner* — Anne L Thomas-Homescu
(74) *Attorney, Agent, or Firm* — Van Hoven PC; Jordan Becker

(57) ABSTRACT

A computer-implemented process is programmed to detect a type or category of document that is being drafted and to suggest one or more phrases or sentences to add to the original and/or substitute for the original, the suggested text being potentially more personable and sincere than the writer's original text. Suggested text phrases are selected from a large corpus of previously manually drafted sentences and phrases. Selected text phrases are ranked and filtered to result in suggesting a manageable set of text phrases. With this approach, adding specially chosen content to existing content can change the warmth or tone of the text while preserving its meaning. Unlike prior approaches, in an embodiment, the process is programmed to artificially understand the intent of the original text as a basis of suggesting other content to add. Furthermore, embodiments may interoperate with a visual or graphical user interface that is programmed to enable users to see what the change to the text will be and whether they want it before they engage with the suggestion.

21 Claims, 4 Drawing Sheets

(51) Int. Cl.
  *G06F 40/205* (2020.01)
  *G06F 40/30* (2020.01)

(56) References Cited

U.S. PATENT DOCUMENTS

| | | | | |
|---|---|---|---|---|
| 9,817,813 | B2* | 11/2017 | Faizakof | G06F 40/30 |
| 10,417,350 | B1* | 9/2019 | Mohamed | G06N 20/00 |
| 10,691,877 | B1* | 6/2020 | Eisner | G06Q 10/101 |
| 10,922,483 | B1* | 2/2021 | Shevchenko | H04L 65/765 |
| 2012/0297294 | A1* | 11/2012 | Scott | G06F 40/253 |
| | | | | 715/264 |
| 2013/0085754 | A1* | 4/2013 | Cohen | G06F 40/274 |
| | | | | 704/235 |
| 2016/0224524 | A1* | 8/2016 | Kay | H04L 51/04 |
| 2016/0306800 | A1* | 10/2016 | Son | G06F 16/86 |
| 2017/0185590 | A1* | 6/2017 | Tetreault | G06F 40/56 |
| 2020/0159823 | A1* | 5/2020 | Lam | G06F 40/253 |
| 2020/0175109 | A1* | 6/2020 | Gee | G06Q 50/01 |
| 2020/0387545 | A1 | 12/2020 | Tripathi | |
| 2021/0026924 | A1* | 1/2021 | Jones | G06F 40/56 |
| 2021/0126881 | A1* | 4/2021 | Ball | G06F 40/216 |
| 2021/0334708 | A1* | 10/2021 | Li | G06F 40/40 |
| 2022/0198136 | A1 | 6/2022 | Peleg | |
| 2022/0245377 | A1* | 8/2022 | Singh | G06F 18/22 |
| 2023/0048742 | A1* | 2/2023 | Mishra | G06V 30/19093 |

OTHER PUBLICATIONS

International Searching Authority, International Search Report and Written Opinion for International Application No. PCT/US22/45562, mailed Jan. 31, 2023, 19 pages.

\* cited by examiner

INTENT-BASED SUGGESTION OF PHRASES IN A TEXT EDITOR

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2020-2021 Grammarly, Inc.

TECHNICAL FIELD

One technical field of the present disclosure is computer-implemented natural language processing. Another technical field is natural language text addition, modification or suggestion. The suggested CPC classification is G06F40/40 and G06N5/04.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Writers regularly struggle to select original or appropriate text for several categories of common communications. Examples include "Happy Birthday" greetings, "Thank You" messages, and "Congratulations" messages. For each of these, writers may have difficulty selecting substantive text with an appropriate tone and a sense of sincerity and personal tailoring. Known computer-based online systems are capable of providing a phrase to use in certain contexts; an example is canned responses in LINKEDIN posts. Other systems are capable of changing text from one type to another by rewriting it with different words, for example from formal to informal, such as WORDTUNE. However, rewriting systems operate at the risk of changing the meaning of the original text.

Based on the foregoing, there is an acute need in the relevant technical fields for a computer-implemented, high-speed online system with real-time response capable of inspecting a draft text and suggesting alternative text that improves the original or supplements the original in a manner that clarifies the text and/or improves its tone.

SUMMARY

The appended claims may serve as a summary of the invention.

DETAILED DESCRIPTION

Figure 1:
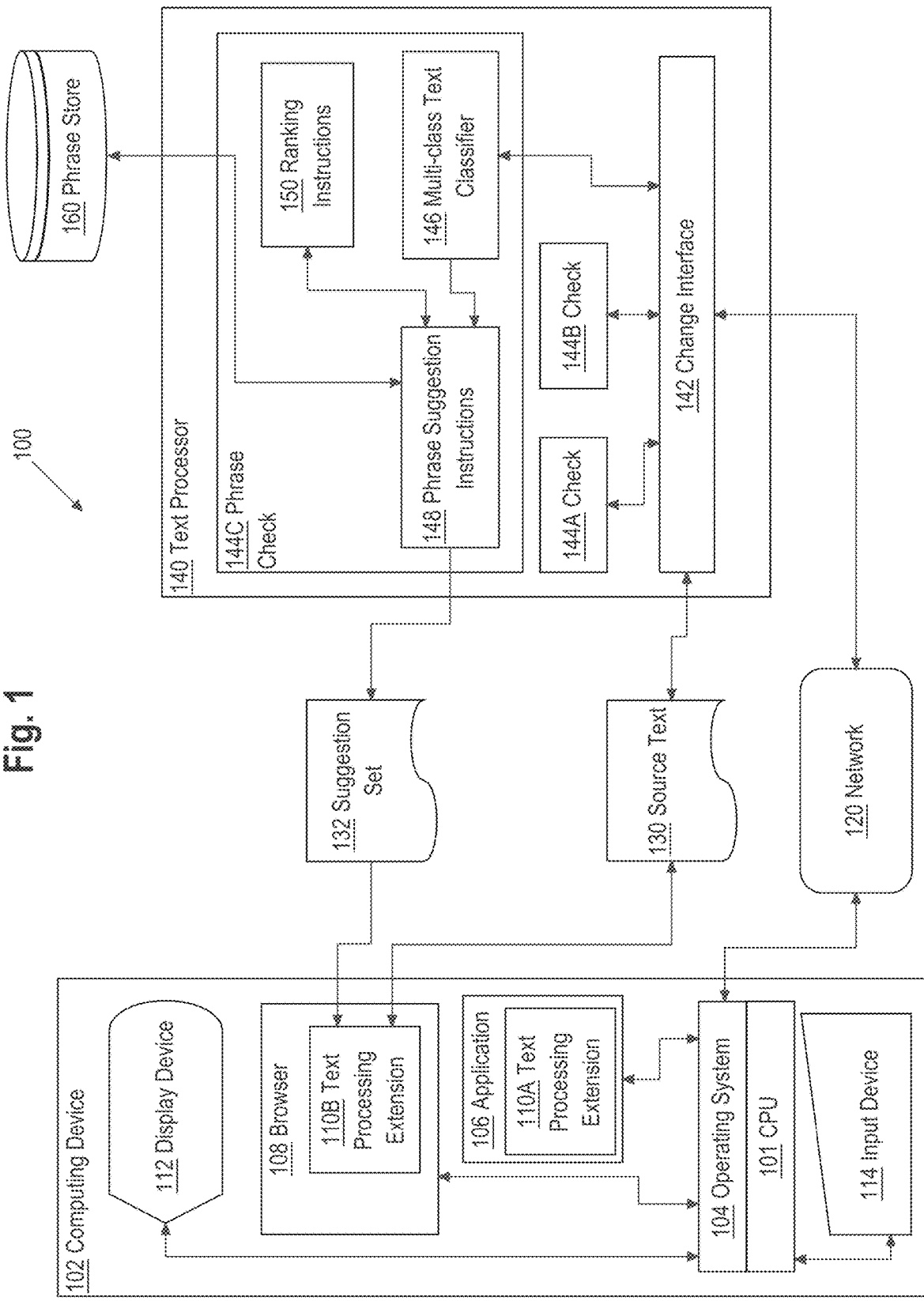
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
 1. General Overview
 2. Structural & Functional Overview
 3. Implementation Example—Hardware Overview 1. General Overview In an embodiment, a computer-implemented process is programmed to detect a type or category of document that is being drafted and to suggest one or more phrases or sentences to substitute for the original, the suggested text being potentially more personable and sincere than the writer's original text. Suggested text phrases are selected from a large corpus of previously manually drafted sentences and phrases. Selected text phrases are ranked and filtered to result in suggesting a manageable set of text phrases. With this approach, adding specially chosen content to existing content can change the warmth or tone of the text while preserving its meaning. Unlike prior approaches, in an embodiment, the process is programmed to artificially understand the intent of the original text as a basis of suggesting other content to add. Furthermore, embodiments may interoperate with a visual or graphical user interface that is programmed to enable users to see what the change to the text will be and whether they want it before they engage with the suggestion.

In an embodiment, the disclosure provides a computer-implemented method executed at a first computer and comprising: programmatically receiving a digital electronic object comprising a source text; dividing the source text into a plurality of source text units; evaluating each particular source text unit among the plurality of source text units using a machine learning model, and receiving a classification output from the machine learning model that classifies each particular source text unit as a particular class of phrase among a plurality of possible classes of phrases; transforming the classification output to yield an output set of phrase suggestions; transmitting the output set of phrase suggestions to a second computer. In one feature, the transforming comprises any one of: mapping the classification output to a plurality of candidate phrase suggestions in a digital database, to yield an initial set of matching phrase suggestions, and filtering the initial set of matching phrase suggestions to yield the output set of phrase suggestions that is fewer in number than the initial set; and mapping the classification output to a plurality of candidate phrase suggestions in a digital database, to yield an initial set of matching phrase suggestions, scoring the candidate phrase suggestions, and selecting top N candidate phrase suggestions to yield the output set of phrase suggestions. The plurality of source text units may be a plurality of sentences of the source text. The plurality of source text units may be a plurality of sentences of the source text, the method further comprising executing the dividing using a computer-implemented parser.

In some embodiments, the machine learning model comprises a trained multi-class text classifier comprising a FASTTEXT classifier. In some embodiments, the computer-implemented method further comprises, before the filtering, ranking the initial set of matching phrase suggestions based on a ranking criterion. In some embodiments, the computer-implemented method further comprises, before the filtering, ranking the initial set of matching phrase suggestions in order of least similarity to the particular source text unit.

The machine learning model may be any of: a plurality of text classifiers coupled as an ensemble; a plurality of targeted rules that are programmed to find relevant words and coupled to a classifier to approve or reject whether an instance of a word is correct.

In some embodiments, the computer-implemented method further comprises the first computer executing a text processor that is communicatively coupled to a text processing extension that is executed at the second computer; programmatically receiving the digital electronic object comprising the source text via a message initiated at the text processing extension and transmitted to the text processor; the text processing extension executing in association with an application program that is executing at the second computer, the text processing extension being programmed to automatically detect a change in a text entry window of the application program and, in response, to initiate the message.

In some embodiments, the computer-implemented method further comprises the first computer executing a text processor that is communicatively coupled to a text processing extension that is executed at the second computer; programmatically receiving the digital electronic object comprising the source text via a message initiated at the text processing extension and transmitted to the text processor; the text processor executing in association with a browser that is executing at the second computer, the text processing extension being programmed to automatically detect a change in a text entry widget of the browser and, in response, to initiate the message.

In some embodiments, the trained multi-class text classifier machine learning model is trained to classify each particular source text unit as a particular class of phrase from among: thank, happy birthday, ask for help, decline invitation, follow up, congratulate, introduce, apology, announcement, setting up a meeting.

2. Structural & Functional Overview

FIG. 1 illustrates a distributed computer system showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the example of FIG. 1, a computing device 102 is communicatively coupled via a network 120 to a text processor 140. In one embodiment, computing device 102 comprises a client-type computing device such as a personal computer, laptop computer, tablet computer, smartphone, or notebook computer. For purposes of illustrating a clear example, a single computing device 102, network 120, and text processor 140 are shown in FIG. 1, but practical embodiments may include thousands to millions of computing devices 102 distributed over a wide geographic area or over the globe, and hundreds to thousands of instances of text processor 140 to serve requests and computing requirements of the computing devices.

Computing device 102 comprises, in one embodiment, a central processing unit (CPU) 101 coupled via a bus to a display device 112 and an input device 114. In some embodiments display device 112 and input device 114 are integrated, for example, using a touch-sensitive screen to implement a soft keyboard. CPU 101 hosts operating system 104, which may include a kernel, primitive services, a networking stack, and similar foundation elements implemented in software, firmware, or a combination. Operating system 104 supervises and manages one or more other programs. For purposes of illustrating a clear example, FIG. 1 shows the operating system 104 coupled to an application 106 and a browser 108, but other embodiments may have more or fewer apps or applications hosted on computing device 102.

At runtime, one or more of application 106 and browser 108 load, or are installed with, a text processing extension 110A, 110B, which comprises executable instructions that are compatible with text processor 140 and may implement application-specific communication protocols to rapidly communicate text-related commands and data between the extension and the text processor. Text processing extensions 110A, 110B may be implemented as runtime libraries, browser plug-ins, browser extensions, or other means of adding external functionality to otherwise unrelated, third-party applications or software. The precise means of implementing a text processing extension 110A, 110B or to obtain input text is not critical provided that an extension is compatible with and can be functionally integrated with a host application 106 or browser 108.

In some embodiments, a text processing extension 110A may install as a stand-alone application that communicates programmatically with either or both of the operating system 104 and with an application 106. For example, in one implementation, text processing extension 110A executes independently of application 106 and programmatically calls services or APIs of operating system 104 to obtain the text that has been entered in or is being entered in input fields that the application manages. Accessibility services or accessibility APIs of the operating system 104 may be called for this purpose; for example, an embodiment can call an accessibility API that normally obtains input text from the application 106 and outputs speech to audibly speak the text to the user, but use the text obtained by the accessibility service in the processes that are described for FIG. 2 and other sections herein.

In some embodiments, each text processing extension 110A, 110B is linked, loaded with, or otherwise programmatically coupled to or with one or more of application 106 and browser 108 and, in this configuration, is capable of calling API calls, internal methods or functions, or other programmatic facilities of the application or browser. These calls or other invocations of methods or functions enable each text processing extension 110A, 110B to detect text that is entered in input fields, windows, or panels of application 106 or browser 108, instruct the application or browser to delete a character, word, sentence, or another unit of text, and instruct the application or browser to insert a character, word, sentence, or another unit of text.

Each of the text processing extensions 110A, 110B is programmed to interoperate with a host application 106 or browser 108 to detect the entry of text in a text entry function of the application or browser and/or changes in the entered text, to transmit changes in the text to text processor 140 for server-side checking and processing, to receive responsive data and commands from the text processor, and to execute presentation functions in cooperation with the host application or browser.

As one functional example, assume that browser 108 renders an HTML document that includes a text entry panel in which a user can enter free-form text describing a product or service. The text processing extension 110B is programmed to detect user selection of the text entry panel, the entry of text or changes in the text within the panel, and to transmit all such text changes to text processor 140. In an embodiment, each text processing extension 110A, 110B is programmed to buffer or accumulate text changes locally over a programmable period, for example, five seconds, and to transmit the accumulated changes over that period as a batch to text processor 140. Buffering or accumulation in this manner, while not required, may improve performance by reducing network messaging roundtrips and reducing the likelihood that text changes could be lost due to packet drops in the networking infrastructure.

A commercial example of text processing extensions 110A, 110B is the GRAMMARLY extension, commercially available from Grammarly, Inc. of Kyiv, Ukraine.

Network 120 broadly represents one or more local area networks, wide area networks, campus networks, or internetworks in any combination, using any of terrestrial or satellite, wired, or wireless network links.

In an embodiment, the text processor 140 comprises one or more server computers, workstations, computing clusters, and/or virtual machine processor instances, with or without network-attached storage or directly attached storage, located in any of enterprise premises, private datacenter, public datacenter and/or cloud computing center. Text processor 140 broadly represents a programmed server computer having processing throughput and storage capacity sufficient to communicate concurrently with thousands to millions of computing devices 102 associated with different users or accounts. For purposes of illustrating a clear example and focusing on innovations that are relevant to the appended claims, FIG. 1 omits basic hardware elements of text processor 140 such as a CPU, bus, I/O devices, main memory, and the like, illustrating instead an example software architecture for functional elements that execute on the hardware elements. Text processor 140 also may include foundational software elements not shown in FIG. 1, such as an operating system consisting of a kernel and primitive services, system services, a networking stack, an HTTP server, other presentation software, and other application software. Thus, text processor 140 may execute at a first computer, and text processing extensions 110A, 110B may execute at a second computer.

In an embodiment, text processor 140 comprises a change interface 142 that is coupled indirectly to network 120. Change interface 142 is programmed to receive the text changes that text processing extensions 110A, 110B transmit to text processor 140, and to distribute the text changes to a plurality of different checks 144A, 144B, 144C. To illustrate a clear example, source text 130 of FIG. 1 represents one or more text changes that text processing extension 110B transmits to change interface 142. In an embodiment, change interface 142 is programmed to distribute each and every text change arriving from a text processing extension 110A, 110B to all of the checks 144A, 144B, 144C, which execute in parallel and/or in independent threads.

Thus, in one embodiment, the text processor 140 may be programmed to programmatically receive a digital electronic object comprising a source text, a message with the source text, an application protocol message with the source text, an HTTP POST request with the source text as a payload, or using other programmed mechanics. In various embodiments, the first computer executes a text processor that is communicatively coupled to a text processor extension that is executed at the second computer and programmatically receives the digital electronic object comprising the source text via a message initiated at the text processor extension and transmitted to the text processor; and/or the text processor extension executes in association with an application program that is executing at the second computer, the text processor extension being programmed to automatically detect a change in a text entry window of the application program and, in response, to initiate the message; and/or the text processor executes in association with browser that is executing at the second computer, the text processor extension being programmed to automatically detect a change in a text entry widget of the browser and, in response, to initiate the message.

Each of the checks 144A, 144B, 144C is programmed to execute a different form of checking or processing of a text change that has arrived. Example functions that checks 144A, 144B could implement include grammar checking, tone detection, and translation. In an embodiment, check 144C is programmed as a phrase check, and therefore it is also denoted "phrase check 144" in this description. In an embodiment, phrase check 144 comprises a multi-class text classifier coupled to phrase suggestion instructions 148, which are coupled to ranking instructions 150; however, other machine learning models can be used. For example, an embodiment may use a number of individual text classifiers ensembled together, or targeted rules may be programmed to find relevant words and then coupled to a classifier to approve or reject whether the instance of a word is correct, thus using a coarse rule followed by ML-based filtering.

Furthermore, phrase check 144C is coupled to or can access, a phrase store 160, which may be integrated with text processor 140 or implemented as separate storage. In an embodiment, phrase store 160 comprises a database, flat file system, object store, or another digital data repository that stores a large number of textual phrase suggestions, in association with category values or tags that specify a category or type of communication, text, or document in which the suggestions could be substituted. Thus, phrase check 144 and/or text processor 140 may be programmed for evaluating each particular source text unit among the plurality of source text units using a trained multi-class text classifier machine learning model and receiving a classification output from the multi-class text classifier that classifies each particular source text unit as a particular class of phrase among a plurality of possible classes of phrases.

Figure 2:
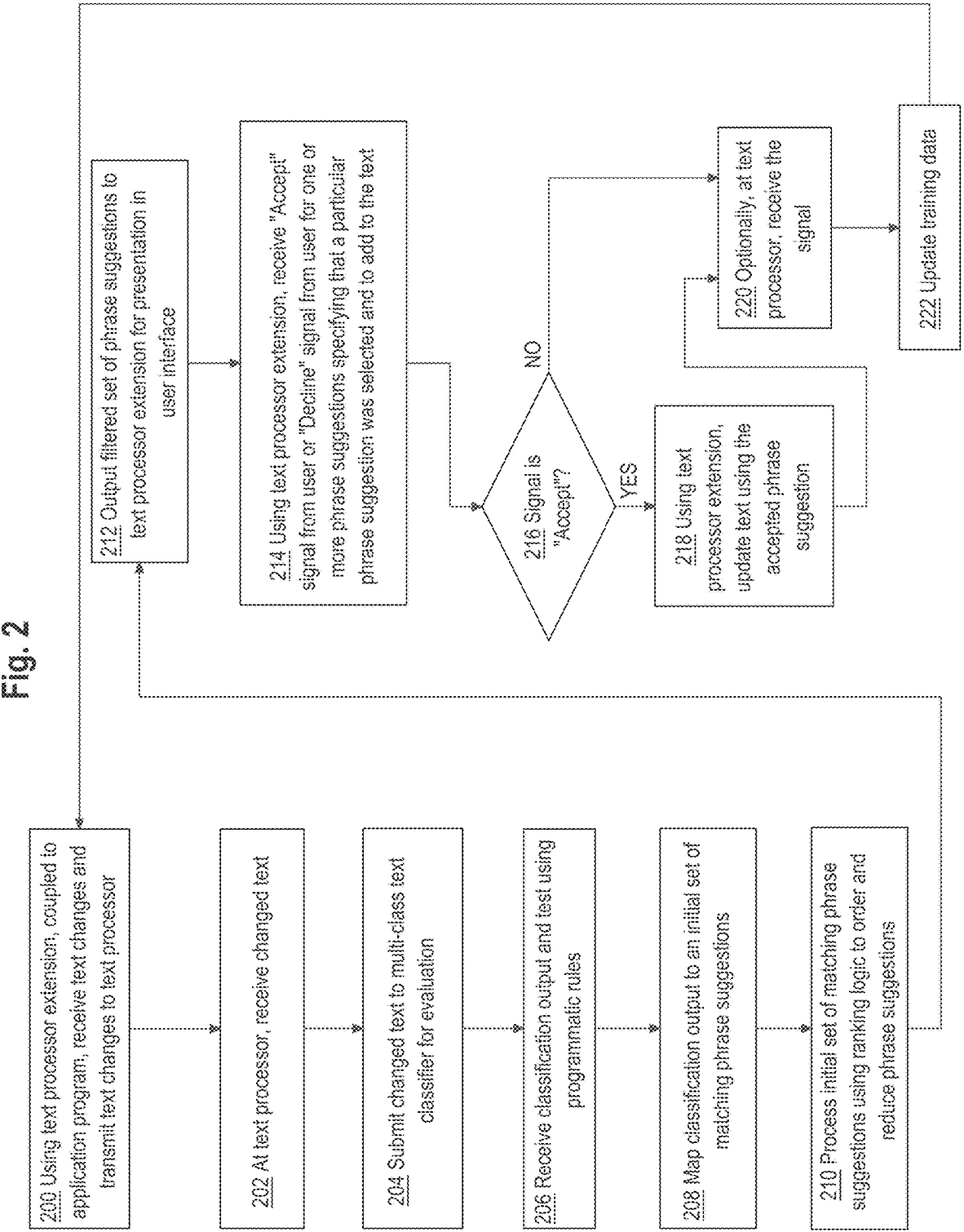
FIG. 2 illustrates a computer-implemented process of classifying a source text, determining phrase suggestions, and presenting the phrase suggestions, in one embodiment.

As further described herein for FIG. 2, in an embodiment, phrase suggestion instructions 148 are programmed, in part, to output a suggestion set 132 to transmit to text processing extension 110B.

FIG. 2 illustrates a computer-implemented process of classifying a source text, determining phrase suggestions, and presenting the phrase suggestions, in one embodiment. FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program, but are provided at the same functional level of illustration that is normally used at the high level of skill in this art to communicate the basis of developing working programs.

At step 200 of FIG. 2, in an embodiment, using a text processing extension coupled to an application program, the process receives text changes and transmits the text changes to a text processor. For example, as described for FIG. 1, each text processing extension 110A, 110B is programmed to transmit any change in the text to text processor 140. Thus, invocation of the process of FIG. 2 occurs in response to a user drafting text in application 106 (FIG. 1) or browser 108, based upon a text processing extension 110A, 110B detecting a change in source text 130 entered at the application or browser and transmitting the source text to change interface 142 of text processor 140 for evaluation using checks 144A, 144B, 144C.

At step 202, at the text processor, the changed text is received. In some embodiments, the text processor 140 is implemented as a back-end server and is programmed to distribute the text changes to a plurality of modules that are programmed to execute multiple types of checks on the text, and the process of FIG. 2 is implemented as one of the checks. For example, source text 130 is received at phrase check 144 via change interface 142.

In an embodiment, the process of FIG. 2 is programmed first to detect that a suggestion should be given, then selects one or more suggestions to provide. In one approach for detection that a suggestion should be given, phrase check 144 is programmed to form vectors that represent sentences and the surrounding context of source text 130, then searches for matching vectors in a labeled dataset that is digitally stored in phrase store 160. The matching may use fuzzy similarity algorithms. In this manner, the text processor may be programmed for dividing the source text into one or more source text units, and one example of the source text unit is a sentence. The dividing may use a parser or other programmed algorithm capable of inspecting natural language text, identifying tokens or units of the text, identifying syntactic units, and so forth. Other units may be used in other embodiments including clauses, multi-sentence groups, paragraphs, and so forth.

Alternatively, a machine learning model, structured as a text classifier, is trained on a large corpus of source sentences and then used to evaluate a current sentence, outputting a classification of where to inject a suggestion. For example, at step 204, the changed text is submitted to a multi-class text classifier for evaluation. Referring to FIG. 1, source text 130 may be programmatically transmitted to multi-class text classifier 146. In one embodiment, text classifier 146 implements a multi-class machine learning model capable of outputting a plurality of different label values, each label value representing a type or category of intent represented in the source text.

In one experimental implementation, text classifier 146 has been programmed to support ten types and to output, for each sentence, label values of "0" to "9" which respectively correspond to thank, happy birthday, ask for help, decline invitation, follow up, congratulate, introduce, apology, announcement, setting up a meeting. In some embodiments, the phrase suggestion instructions 148 are programmed to generate phrase suggestions for fewer than all the intents that the text classifier 146 can label. That is, the text classifier may generate label values for certain intents as noted above, but phrase suggestions will not be offered for those intents. Whether phrase suggestions are offered for every intent or label value depends on whether phrase store 160 has been loaded with phrase suggestions for every intent.

In an embodiment, text classifier 146 may be programmed using the FASTTEXT model library authored by Facebook, Inc., and summarized at the time of this disclosure in the folder/tools/fasttext of the internet domain "ai.facebook.com". In experimentation, the inventors determined that FASTTEXT, as supplied by FACEBOOK, does not generalize well without loss of precision when previously unseen labels are processed. In one experiment, FASTTEXT was integrated into a working implementation via these steps:

1. Manually author a small set of target-like sentences.
2. Use Universal Sentence Encoder to find semantically-related sentences from a large random text corpus.
3. Perform human annotation to validate the selected sentences in being truthful to the definition of target intent.
4. Use the validated data as the training dataset for the FASTTEXT classifier.

In another experiment, acceptable results were obtained using FASTTEXT embeddings as a metric of semantic distance between training sentences and user-input sentences under evaluation. Various sources of data for training were evaluated, such as news headlines as a substitute for sentences indicating intent, and ultimately a training dataset of specific intent samples was manually prepared and input. TABLE 1 provides an excerpt of intent samples that could be used in an embodiment.

TABLE 1

EXAMPLE INTENT TRAINING DATASET

```
intent_samples = [
  [
  "Thank you for a fruitful meeting earlier today. ",
  "I especially appreciate your offer to connect me with others in your network.
  "We just wanted to THANK YOU for everything you did for her this year",
  "We want to take this opportunity to thank you for all of your hard work and effort as
of late.",
  "I wanted to personally take this time to thank you for your willingness to engage with
me over these last couple of months.",
  ],
  [
  "Please do accept our sincere apologies and provide us with another opportunity to
redeem ourselves as a viable service provider.",
  "I would like to offer my deepest apologies, I genuinely forgot to complete the
homework, after I finished creating notes for one course it completed slipped my mind
and I assumed I had finished chemistry work.",
  "I am sorry for leaving the call yesterday before the meeting was over.",
  ],
  [
  "Yes let's meet next week, do you want to meet Monday? "
  "Perfect, let's meet on {February 15th} at 09:15 (Local time). ",
  "Let's meet tomorrow at 12 pm in the office to fix the timeline so as we can meet the
deadline. ",
  "I just wanted to reach out to you guys to set up a meeting where we can all meet.",
  ],
  [
  "I just want to confirm whether you received my last email or not.",
  "Please confirm if we can include this article in today's report with available content?",
  "Also, we talked about the ability to dock a small boat there at the pier. I would like to
verify the exact cost of this.",
  "Just confirming, are we still on time for the delivery of this load?",
  ],
  [
  "Hi, confirming that I have still not received a refund per email trail, please advise.",
  "I can confirm that the migration of the product to {Cloud Service Provider} has been
successful."
  ]
]
```

APPENDIX 1 is a copy of a JUPYTER notebook that documents a first example of preparing and training a machine learning model that can be used in one embodiment.

APPENDIX 2 is a copy of a JUPYTER notebook that documents a second example of preparing and training a machine learning model that can be used in one embodiment.

APPENDIX 3 is a copy of a JUPYTER notebook that documents an example of retraining a machine learning model that can be used in one embodiment.

Each of APPENDIX 1, APPENDIX 2, APPENDIX 3 forms a part of the present specification and/or disclosure. To the extent that APPENDIX 1, APPENDIX 2, APPENDIX 3 are deemed separate documents, each and every one of APPENDIX 1, APPENDIX 2, APPENDIX 3 is hereby incorporated by reference as if fully set forth herein.

All of APPENDIX 1, 2, 3 are based on FASTTEXT. As an alternative to FASTTEXT, a very deep convolutional neural network (VDCNN) can be used. Experimental implementations also have used embedding of sentences with multiple feed-forward layers in a CNN.

Phrase store 160 digitally stores a plurality of different sentences, clauses, or phrases, each stored in association with a label value corresponding to one or more of the label values that text classifier 146 can output. Phrase store 160 may use relational database tables, non-relational tables, flat files, or other forms of digital data storage to store sentences, clauses, or phrases with label values. In some embodiments, the sentences, clauses, or phrases are manually prepared and manually labeled. For example, analytical linguists or copywriters can draft high-quality phrase suggestions for storing in phrase store 160.

Additionally or alternatively, sentences, clauses, or phrases may be synthesized, or generated programmatically, under stored program control by using a sentence similarity processor to receive an input sentence and to generate output synthetic data for phrase store 160. For example, text semantic similarity can be processed using open-source software available from GOOGLE using TENSORFLOW HUB and DATAFLOW, as described in the article "analyzing-text-semantic-similarity-using-tensorflow-and-cloud-dataflow" which is available at the time of this disclosure in the folder/architecture of the internet domain cloud.google.com. Furthermore, similar programmatic techniques may be used to synthesize a plurality of sentences, clauses, or phrases to supplement a training dataset with which the text classifier 146 is trained.

Referring again to FIG. 2, at step 206, the classification output is received and tested using a plurality of programmatic rules that test whether a particular phrase lacks a subordinate clause with more details, whether a phrase occurs in a prominent position of the source text 130, whether the phrase occurs under negations, whether the phrase has a correct sequence of words and structure, and so forth. Thus, in an embodiment, the process of FIG. 2 is programmed to ensure that the detection results are accurate and useful.

At step 208, the process is programmed to map the classification output to an initial set of matching phrase suggestions, for example, in a plurality of candidate phrase suggestions that are stored in a digital database. Thus, after detection of qualifying sentences, phrases, or clauses in source text 130, the process determines which phrases to suggest, selected from a large plurality of candidate phrase suggestions in phrase store 160. Step 208 may include generating and submitting a query to phrase store 160 to select a result set of all stored phrases having label values that match an output label value from text classifier 146.

However, the result set may contain too many candidate phrases to present in a user interface of the application 106 or browser 108 (FIG. 1). Therefore, in an embodiment, at step 210, the process is programmed to process the initial set of matching phrase suggestions using ranking instructions 150 to order the phrase suggestions and filter or reduce the phrase suggestions to a reduced-size set, comprising an output set of phrase suggestions that is fewer in number than the initial set. In some embodiments, filtering is executed first, for example, to select the first five or ten candidate phrases from the result set, and then ranking is used. Alternatively, filtering to five or ten candidate phrases can be executed without ranking.

In some embodiments, approaches other than mapping followed by filtering may be used at step 208, step 210. For example, instructions may be programmed to score the candidate phrase suggestions, for example, using an ElasticSearch information retrieval score, and to select the top N candidates, without a need for a filtering step. The value "N" may vary in different embodiments; example values are "1" to "10" or any integer within a range of "1" to "10".

The ranking instructions 150 may be programmed to rank the initial set of phrase suggestions according to any useful ranking criterion such as similarity to a source text unit, dissimilarity, popularity across a community of users, or other criteria. In one ranking approach, step 210 is programmed to order the result set of phrase suggestions in inverse order of similarity to the source text 130. Ordering in inverse order of similarity can avoid presenting, to the user, a suggestion that is too similar to the source text 130. To support this step, in an embodiment, the result set of candidate phrases obtained at step 208 can be submitted in real-time to a sentence similarity processor to receive, in return, a similarity value for each candidate phrase that reflects a degree of similarity to the source text 130. Or, ranking instructions 150 may be programmed to calculate, in real-time, a set similarity value between n-grams that are present in source text 130 and each candidate phrase of the result set; the resulting set similarity values may be programmatically provided to phrase suggestion instructions 148 for presentation, in suggestion set 132, in order of lowest similarity first. The result set of candidate phrase suggestions received from phrase store 160 may comprise multiple similar variants. Examples include "I am grateful" and "I am very grateful".

In an embodiment, the effect of ranking instructions 150 when programmed as just described is to avoid placing such similar variants in suggestion set 132 so that variants are near to one another in order when presented in the application 106 or browser 108 via the text processing extensions 110A, 110B. To enhance this effect, ranking instructions 150 and/or phrase suggestion instructions 148 may be programmed using a clustering approach. For example, candidate phrase suggestions of the result set may be divided into a plurality of different groups by executing a clustering algorithm on the result set to result in grouping similar phrase suggestions. One cluster might include all phrases expressing gratitude, for example. Five or six clusters could be used, for example, and ranking instructions 150 and/or phrase suggestion instructions 148 may be programmed to conduct ranking as previously described and then select the highest-ranked phrase from each cluster successively to form a final set of phrase suggestions for output as the suggestion set 132.

In an embodiment, source text 130 may comprise a plurality of different sentences each yielding different label values for different types or different categories when the sentences are processed using the text classifier 146. In an embodiment, phrase suggestion instructions 148 are programmed to generate phrase suggestions only for a first label value that is initially output from text classifier 146 for a first sentence that is processed. Or, in an embodiment, the text classifier 146 is programmed to process all sentences that are present in source text 130, resulting in outputting a plurality of different label values; phrase suggestion instructions 148 may be programmed to select one label value, using pseudorandom selection, from among all the label values and then select candidate phrase suggestions only for the selected single label value.

At step 212, the process is programmed to output a filtered set of phrase suggestions to the text processing extension for presentation in a user interface, for example, at a mobile computing device or another computing device that hosts or executes the text processing extension. Step 212 may include filtering the initial set of matching phrase suggestions, for example, to select only the top N matching phrase suggestions, based on the ranking. N may have a range of values depending on the display capabilities of the mobile computing device or another computing device that hosts or executes the text processing extension or depending upon the size of a graphical user interface panel, widget, or another visual element in which the suggestions are to be displayed. In one embodiment, the range of N is from one to ten, but other ranges could be used in different embodiments and the specific value of N is not critical.

At this stage, the text processing extension, at the mobile computing device or another computing device, may be programmed to output a display of the filtered set of phrase suggestions that have been received at the text processing extension via step 212. Output may comprise displaying a list of the filtered phrase suggestions, instantiating a window, panel, or widget within a graphical user interface, or similar visual output. The specific means of output is not critical provided that some means is provided to a user, of the mobile computing device or another computing device that hosts or executes the text processing extension, to view and consider whether to select one of the phrase suggestions.

Figure 3:
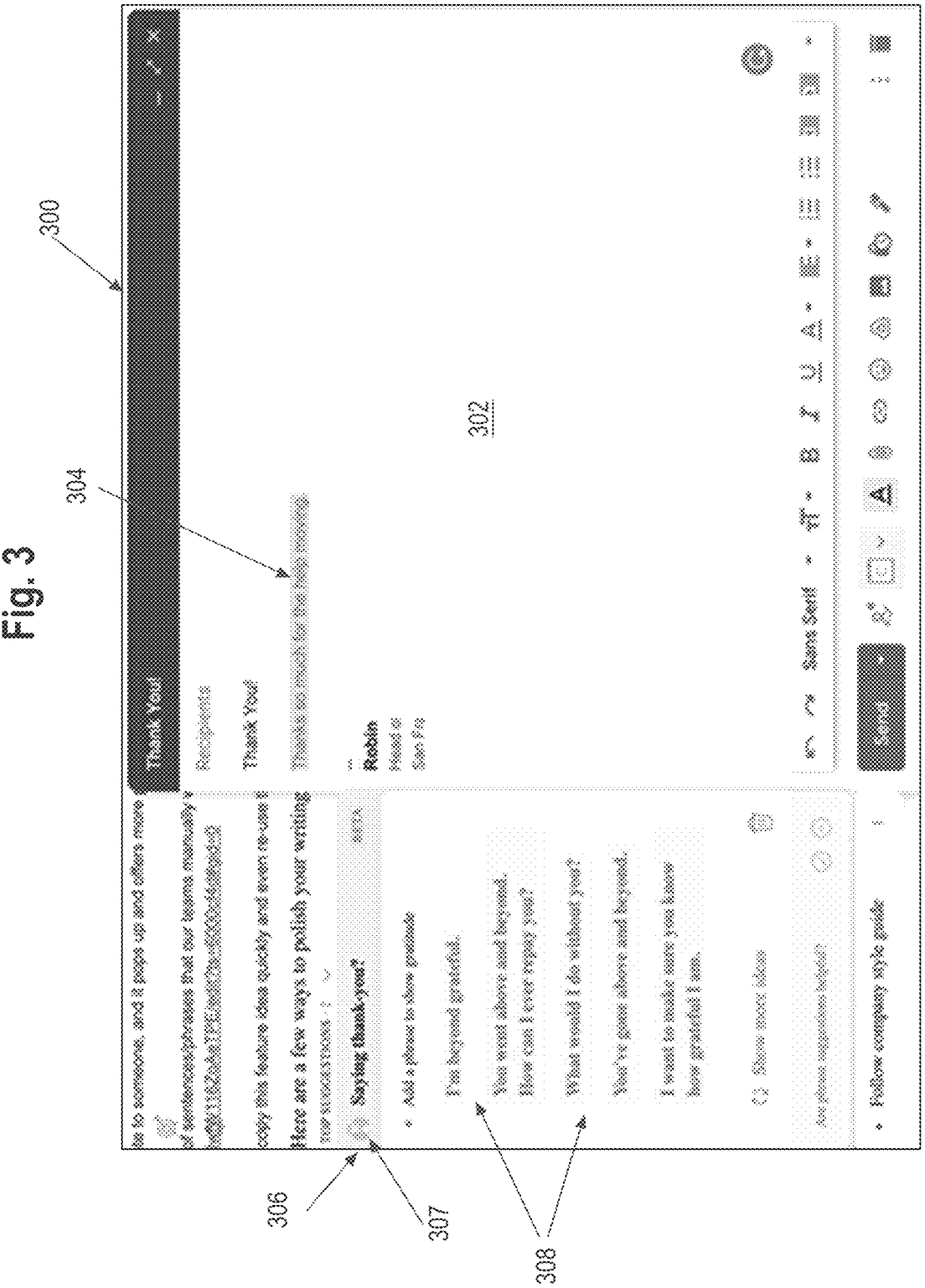
FIG. 3 illustrates an example of a graphical user interface that may be programmed to display phrase suggestions in conjunction with an application.

FIG. 3 illustrates an example of a graphical user interface that may be programmed to display phrase suggestions in conjunction with an application. In FIG. 3, a graphical user interface (GUI) window 300 is displayed in the ordinary operation of an application program, browser, or other program executed at a second computer, such as a mobile computing device. In an embodiment, an application running with GUI window 300 provides electronic mail (email) composing functions and has instantiated a sub-window 302 which shows, in FIG. 3, a portion of an email that is undergoing composition. The sub-window includes a Recipients list, a subject of "Thank You!" in this example, and a source text unit 304 which states, in this example, "Thanks so much for the help moving."

In response to input at the second computer entering the source text unit 304, a text processing extension 110A, 110B is programmed to instantiate and cause displaying a second sub-window 306 that comprises a header bar 307 and a plurality of output phrase suggestions 308. The text processing extensions 110A, 110B may be programmed to use system calls, function calls, method calls, or other programmatic means to instantiate sub-windows and cause labels and data to be displayed. In this example, the header bar 307 states "Saying thank-you?" to indicate that the multi-class text classifier has classified the source text unit 304 as a "Thank you" phrase. The output phrase suggestions 308 each correspond to the same sentiment, category, or class as the source text unit 304, based on the classification and mapping steps that have been previously described. In an embodiment, each of the output phrase suggestions 308 is output as a selectable hyperlink which, when selected, causes the text processing extension 110A, 110B to execute a call to delete the source text unit 304 in the sub-window 302 and to insert the selected output phrase suggestion 308.

At step 214, the process is programmed to receive, using the text processing extension, a signal from a user of the mobile computing device or the other computing device that hosts or executes the text processing extension to accept or decline one or more of the phrase suggestions, specifying that a particular phrase suggestion was selected to add to the text. For purposes of illustrating a clear example, step 214 and aspects of this description use the labels Accept and Decline to refer to input signals that could be received at step 214 or other steps, but these labels are merely examples and different implementations may use other internal values to identify different input.

At step 216, the process is programmed to determine whether an Accept signal or equivalent, was received as input. If step 216 is FALSE or NO, then control transfers to step 220 at which, optionally, the text processor may receive the signal, for example, a Decline signal. At step 222, the process may be programmed to update training data, used to train the multi-class text classifier, based on the signal. Thus, steps 216, 220, 222 may form a feedback loop by which training data is continuously updated based on user signals to indicate whether a particular phrase suggestion was correct, or useful, or not.

If step 216 is TRUE or YES, then at step 218, the process is programmed to update, using the text processing extension, the source text using the accepted phrase suggestion. Updating may comprise, for example, the text processing extension programmatically invoking an API call, internal method, or other programmed function, of the browser or app that the text processing extension extends, to insert the phrase suggestion into the source text, or to delete the original sentence and insert the phrase suggestion. Control then transfers to step 220, which is processed as described above.

The approaches disclosed herein provide efficient technical means for automatically updating a text that has been written using computer support. Unlike past approaches, the intent of a source text may be detected programmatically and then used to drive automatic machine selection of candidate phrase suggestions, with ranking if appropriate to eliminate candidate phrase suggestions that are too similar to one another. An ancillary benefit is that the accuracy, tone, and clarity of written communication may be improved with computer assistance. The approaches herein provide efficient machine assistance to individuals who are not naturally strong writers in finding text that accurately reflects the original intent of their draft text.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field-programmable gate array (FPGA) that is persistently programmed to perform the techniques, or may include at least one general-purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
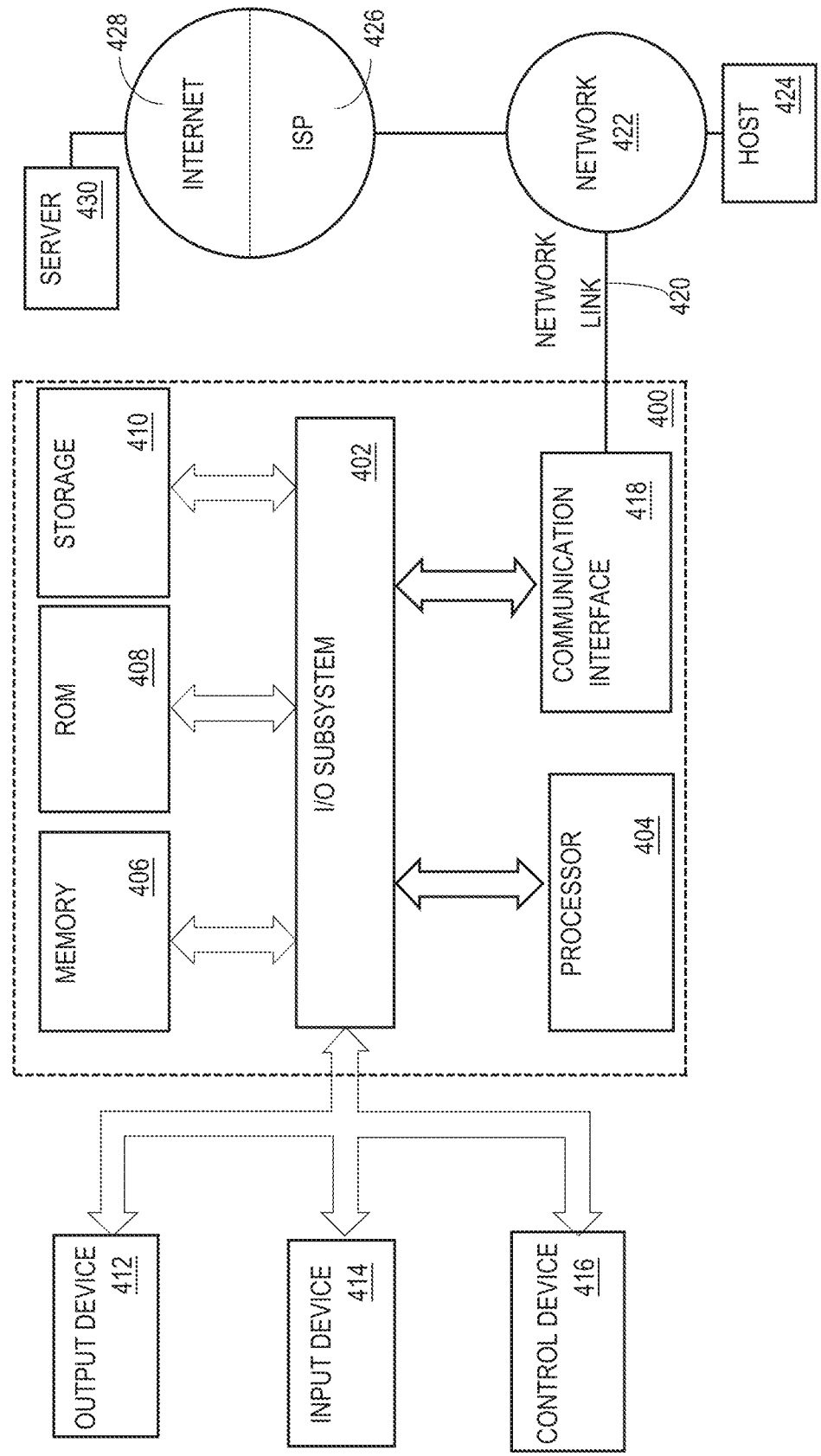
FIG. 4 illustrates a computer system with which one embodiment could be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanisms for communicating information and/or instructions between the components of the computer system 400 over electronic signal paths. The I/O subsystem 402 may include an I/O controller, a memory controller, and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to IO subsystem 402 for electronically digitally storing data and instructions to be executed by processor 404. Memory 406 may include volatile memory such as various forms of random-access memory (RAM) or another dynamic storage device. Memory 406 also may be used for storing temporary variables or other intermediate information during the execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read-only memory (ROM) 408 or other static storage devices coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disks such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using a structured query language (SQL) or no SQL, an object store, a graph database, a flat-file system, or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include another type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators, or servos.

At least one input device 414 is coupled to VO subsystem 402 for communicating signals, data, command selections, or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or another type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware, and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware, and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid-state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 and place the data on a bus. VO subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to a network link(s) 420 that are directly or indirectly connected to at least one communication network, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 422 broadly represents a local area network (LAN), wide-area network (WAN), campus network, internetwork, or any combination thereof. Communication interface 418 may comprise a LAN card to provide a data communication connection to a compatible LAN or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic, or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a worldwide packet data communication network represented as internet 428. A server computer 430 may be coupled to internet 428. Server 430 broadly represents any computer, data center, virtual machine, or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm, or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer, and data storage layer such as a relational database system using a structured query language (SQL) or no SQL, an object store, a graph database, a flat-file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

APPENDIX 1

(sheets follow)

In [13]:

```python
from typing import List, Any, Tuple
import pandas as pd
import numpy as np
import fasttext, sys, os if not (oracle_root := os.path.split(os.getcwd())[0]) in sys.path:
    sys.path.append(oracle_root)

from oracle.model.fasttext_wrapper.classifier import FasttextClassifier, get_fasttext_dat
aset_path
from oracle.model.fasttext_wrapper.preprocessing import preprocess_fasttext_full, preproc
ess_fasttext_minimal, preprocess_fasttext_fake_tokenize from oracle.model.intent import create_USE_sentence_model
from oracle.model.intent.use_models import ALL_USE_MODEL_DEFS
from oracle.model.intent.sent_sim.use4 import USEFullSentVecModel
from oracle.model.utils import get_data_path from sklearn.model_selection import train_test_split
from sklearn.metrics import confusion_matrix, plot_confusion_matrix, precision_recall_cur
ve from matplotlib import pyplot as plt
import seaborn as sns %matplotlib inline
```

In [290]:

```python
def conf_mat(m, X_test, y_test, title):
    plot_confusion_matrix(
        m, X_test, y_test,
        labels=ALL_LABELS,
        # set to 'true' to show recall
        # 'pred' shows precision
        normalize='pred',
        xticks_rotation='vertical'
    ); plt.title(title)
```

Data preparation

In [76]:

```python
def load_xlsx_raw(
    path: str,
    label_col_name='label',
    xls_sheet_name='Final Judgments',
    only_Grammarly=False
):
    xls = pd.read_excel(path, sheet_name=xls_sheet_name)

label_col = xls['Grammarly'] if only_Grammarly else \
        xls['Grammarly'].fillna(xls[xls.columns[2]]) \
        if 'Grammarly' in xls.columns \
        else xls[xls.columns[2]]

return pd.concat(
        [
            xls['source_id'],
            xls['sentence'],
            label_col.rename(label_col_name)
        ],
        axis=1
    )
```

```python
assert (xls := load_xlsx_raw('../data/intents/first5/xlsx/thank-1.xlsx')).shape == (1000
, 3,) and \
    list(xls.columns) == ['source_id', 'sentence', 'label']

assert (xls := load_xlsx_raw('../data/intents/first5/xlsx/announce-2.xlsx', only_Grammarl
y=True))[xls['source_id'] == 8721]['label'].isna().values[0]
```

In [3]:
```python
def fold_binary(dfs: List[pd.DataFrame], label_col_name='label'):
    r = None for df in dfs:
        if r is None: r = df
        else:
            r = pd.merge(
                r, df,
                how='outer', on=['source_id', 'sentence'], validate='one_to_one',
                suffixes=('', '_')
            )

# overwrite left labels with right labels
            r[r.columns[2]] = r[r.columns[3]].fillna(r[r.columns[2]])

# remove right labels
            del r[r.columns[3]]

del r['source_id']
    return r assert fold_binary([
    load_xlsx_raw(p) for p in ['../data/intents/first5/xlsx/thank-1.xlsx']]).shape == (1
000, 2,)

assert fold_binary([load_xlsx_raw(p) for p in [
    '../data/intents/first5/xlsx/set_up_meeting-1.xlsx',
    '../data/intents/first5/xlsx/set_up_meeting-2.xlsx',
    '../data/intents/first5/xlsx/set_up_meeting-3.xlsx'
]]).shape == (12536, 2,)
```

In [135]:
```python
def preprocess_binary(df: pd.DataFrame):
    certain_labels = df[df['label'].isin(set([0, 1]))].dropna()
    dupes = set((vcts := certain_labels['source_id'].value_counts()[vcts > 1].index)
    return certain_labels[~certain_labels['source_id'].isin(dupes)]

assert preprocess_binary(load_xlsx_raw('../data/intents/first5/xlsx/apology-2.xlsx')).sha
pe == (11923, 3,)

assert preprocess_binary(load_xlsx_raw('../data/intents/first5/xlsx/thank-2.xlsx')).shape
== (11486, 3)
```

In [166]:
```python
INTENT_NAMES = [
    'announce', 'apology', 'ask_help', 'set_up_meeting', 'thank'
]

ALL_LABELS = INTENT_NAMES + ['none']
```

In [136]:
```python
all_intents_binary = [
    (
        intent,
        fold_binary([
            preprocess_binary(load_xlsx_raw(
                p,
                # announce datasets are special: only Grammarly column should be used
```

```
            only_Grammarly=intent == 'announce' and i == 2
        ))
        for i in [1, 2, 3]
        if os.path.exists((p := f'../data/intents/first5/xlsx/{intent}-{i}.xlsx'))
    ])
    )
    for intent in INTENT_NAMES
} assert len(all_intents_binary) == 5
pd.DataFrame([(name, df['label'].value_counts().sort_index().values, len(df)) for name,
df in all_intents_binary])
```

Out[136]:

|   | 0 | 1 | 2 |
|---|---|---|---|
| 0 | announce | [8550, 2519] | 11069 |
| 1 | apology | [4571, 7849] | 12420 |
| 2 | ask_help | [1858, 10482] | 12340 |
| 3 | set_up_meeting | [1210, 11326] | 12536 |
| 4 | thank | [3960, 8526] | 12486 |

In [7]:

```
neutral_62500 = pd.concat([
    pd.read_csv('../data/intents/first5/neutral_62500_anoned.csv', header=None)[1].renam
e('sentence'),
], axis=1)

neutral_62500['label'] = 0 neutral_62500
```

Out[7]:

|   | sentence | label |
|---|---|---|
| 0 | BJ Services: 495 | 0 |
| 1 | Box style 7 | 0 |
| 2 | Per Tracking#1ZAW12345678901234 - (25) polos | 0 |
| 3 | If you are not changing ink colors, those can ... | 0 |
| 4 | leads plans and manages the execution of new e... | 0 |
| ... | ... | ... |
| 62495 | #include<cstdio> | 0 |
| 62496 | The latter. | 0 |
| 62497 | Tropical storm force winds are expected to rem... | 0 |
| 62498 | ▮▮▮▮▮▮▮▮▮▮▮▮▮▮▮▮▮▮▮▮▮▮▮ | 0 |
| 62499 | ▮▮▮▮▮ He did not show his table, book,... | 0 |

62500 rows × 2 columns

In [137]:

```
def combine_multilabel(dfs: Tuple[str, List[Any]], neutral_label='none'):
    return pd.concat(
        [
            pd.concat(
                [
                    df['sentence'],
                    df['label'].map(lambda x: name if x == 1 else neutral_label).rename(
```

```
'label')
            ],
            axis=1
        )
        for name, df in dfs
    ],
    ignore_index=True,
    axis=0
)

all_intents_multilabel = combine_multilabel(
    [
        *all_intents_binary,
        ('none', neutral_62500)
    ]
).sample(frac=1, random_state=1337).reset_index(drop=True)

all_intents_multilabel['label'].value_counts()
Out[137]:

none            82649
set_up_meeting  11326
ask_help        10482
thank            8526
apology          7849
announce         2519
Name: label, dtype: int64

In [138]:

all_intents_multilabel[:10]

Out[138]:
```

| | sentence | label |
|---|---|---|
| 0 | When will you are available, so we can come in... | set_up_meeting |
| 1 | ███████████████████████████ | none |
| 2 | INVOICE - FACTS SIS Software | none |
| 3 | Well noted with many thanks. | none |
| 4 | ███████████████████████████ | none |
| 5 | Adaptability | Responsibility | Belief | Harmo... | none |
| 6 | Thank you for the chat earlier, and we look fo... | set_up_meeting |
| 7 | To make it easier, check out my calendar avail... | set_up_meeting |
| 8 | their delivery flows. | none |
| 9 | Please advice ASAP so that I | ask_help |

Exp 1: default multilabel fasttext vs USE

```
In [291]:

X_all, y_all = all_intents_multilabel['sentence'], all_intents_multilabel['label']

X_train, X_test, y_train, y_test = train_test_split(X_all, y_all, test_size=.2, random_s
tate=1337)

len(X_train), len(X_test)

Out[291]:

(98680, 24671)

In [294]:
```

```python
m = FasttextClassifier(preprocess_input=preprocess_fasttext_full).fit(
    X_train.values.tolist(),
    y_train.values.tolist()
)
with get_fasttext_dataset_path(X_test, y_test) as p:
    print(m._ft_model.test(p))
    print(m._ft_model.test_label(p))
```

(24671, 0.9182846256738681, 0.9182846256738681)
{'__label__announce': {'precision': 0.752112676056338, 'recall': nan, 'f1score': 1.504225352112676}, '__label__apology': {'precision': 0.7887055837563451, 'recall': nan, 'f1score': 1.5774111675126903}, '__label__thank': {'precision': 0.8577981651376146, 'recall': nan, 'f1score': 1.7155963302752293}, '__label__set_up_meeting': {'precision': 0.920016927634363, 'recall': nan, 'f1score': 1.840033855268726}, '__label__ask_help': {'precision': 0.9148837209302325, 'recall': nan, 'f1score': 1.829767441860465}, '__label__none': {'precision': 0.9408481465752594, 'recall': nan, 'f1score': 1.8816962931505188}}

In [293]:
```python
plot_confusion_matrix(
    m.inference,
    X_test, y_test,
    labels=INTENT_NAMES + ['none'],
    normalize='pred',
    xticks_rotation='vertical'
); plt.title('fasttext with default params')
```
Out[293]:

Text(0.5, 1.0, 'fasttext with default params')

In [14]:
```python
sent_vec_model = USEFullSentVecModel(get_data_path('model/use_v4'))
```

In [15]:
```python
use_m = create_USE_sentence_model(ALL_USE_MODEL_DEFS, sent_vec_model)
```

In [19]:
```python
class UseModelWrapper:
    _estimator_type = 'classifier' def __init__(self, use_m, none_label='none', thresh=0.5):
        self.use_m = use_m
        self._nonelabel = none_label
        self._thresh = thresh def predict(self, Xs: List[str]):
        return [
            p[0] if p is not None and p[1] >= self._thresh else self._nonelabel
            for p in self.use_m.predict_proba(Xs)
        ]
```

In [250]:
```python
plot_confusion_matrix(
    UseModelWrapper(use_m),
    X_test, y_test,
    labels=INTENT_NAMES + ['none'],
    normalize='pred',
    xticks_rotation='vertical',
); plt.title('Current USE sentence level model')
```
Out[250]:

Text(0.5, 1.0, 'Current USE sentence level model')

Investigate potential data issues

```
In [32]:
all_intents_multilabel[all_intents_multilabel['label'] == 'announce'].sample(n=100)
Out[32]:
```

|  | sentence | label |
|---|---|---|
| 93079 | I wanted to just share some exciting news with... | announce |
| 27963 | I'm pleased to announce that ▇▇▇ went li... | announce |
| 18757 | We're pleased to announce that we are now able... | announce |
| 5978 | After reviewing your profile, we are pleased t... | announce |
| 72736 | ▇▇▇ pleased to announce that new employee Ms.... | announce |
| ... | ... | ... |
| 5057 | He will be joining us as an Associate Partner ... | announce |
| 77630 | ▇▇▇▇▇▇▇▇▇▇▇▇▇▇▇▇▇▇▇▇▇▇▇ | announce |
| 67446 | We are so excited to announce the launch of ou... | announce |
| 6540 | I have the pleasure of sharing our most exciti... | announce |
| 35839 | ▇▇▇▇▇▇▇▇▇▇▇▇▇▇▇▇▇▇▇▇▇▇▇ | announce |

100 rows × 2 columns

```
In [34]:
all_intents_multilabel.iloc[5978]['sentence']
Out[34]:
'After reviewing your profile, we are pleased to announce that you have been appointed as Secretary-General @ GMUN 20.'

In [40]:
all_intents_binary[0][1][all_intents_binary[0][1]['label'] == 1].sample(n=100)
Out[40]:
```

|  | sentence | label |
|---|---|---|
| 2196 | We are proud to announce that we have posted o... | 1.0 |
| 11857 | We were disappointed that we needed to change ... | 1.0 |
| 55 | As a reminder, a mass text will go out tomorro... | 1.0 |
| 8713 | ▇▇▇▇▇▇▇▇▇▇▇▇▇▇▇▇▇▇▇▇▇▇▇ | 1.0 |
| 9033 | We have put the last 30 months into creating t... | 1.0 |
| ... | ... | ... |
| 9168 | We are pleased to announce that ▇▇▇▇▇▇▇ | 1.0 |
| 270 | We are happy to announce that we are going to ... | 1.0 |
| 2503 | It is with overwhelming joy that we announce o... | 1.0 |
| 7141 | We are waiting for the changes to be moved int... | 1.0 |
| 4993 | We added some new photos to the Yellow listing... | 1.0 |

100 rows × 2 columns

```
In [45]:
(xls := load_xlsx_raw('../data/intents/first5/xlsx/announce-2.xlsx'))[xls['source_id'] ==
2300]

Out[45]:
```

|      | source_id | sentence | label |
|------|-----------|----------|-------|
| 1799 | 2300 | We are excited to partner with you! | 0.0 |

```
In [59]:
all_intents_binary[0][1].iloc[8713], all_intents_binary[0][1].iloc[8713]['sentence']

Out[59]:
(sentence    We are excited for ████████████████████...
 label                                                1
 Name: 8713, dtype: object,
 'We are excited for ████████████ ██████████████████████ Class
next week!')

In [46]:
(xls := load_xlsx_raw('../data/intents/first5/xlsx/announce-2.xlsx'))[xls['source_id'] ==
8721]

Out[46]:
```

|      | source_id | sentence | label |
|------|-----------|----------|-------|
| 8220 | 8721 | We are excited for ███████████ | 1.0 |

```
In [58]:
(xls := pd.read_excel(
    '../data/intents/first5/xlsx/announce-2.xlsx',
    sheet_name='Final Judgments',
))[xls['source_id'] == 8721]

Out[58]:
```

|      | source_id | sentence | does_the_sentence_express_the_intent_to_announce | Grammarly | Appen judgment sum |
|------|-----------|----------|---|---|---|
| 8220 | 8721 | We are excited for ██████████ | 1 | NaN | 1 |

```
In [65]:
(xls := pd.read_excel(
    '../data/intents/first5/xlsx/announce-2.xlsx',
    sheet_name='Final Judgments',
))[xls['sentence'] == 'We are excited for ████████████ ████████████████████
██████████ next week!']

Out[65]:
```

|      | source_id | sentence | does_the_sentence_express_the_intent_to_announce | Grammarly | Appen judgment sum |
|------|-----------|----------|---|---|---|
| 8220 | 8721 | We are excited for ██████████ | 1 | NaN | 1 |

Result: the issue was with inconsistent XLSX table format (for announce-2, only Grammarly column should be used)

Tune fasttext

In [295]:

```
preprocess input m = FasttextClassifier(preprocess_input=preprocess_fasttext_full).fit(
    [preprocess_fasttext_full(x) for x in X_train.to_list()],
    y_train.to_list()
)
with get_fasttext_dataset_path(map(preprocess_fasttext_full, X_test.to_list()), y_test.to
_list()) as p:
    r = m._ft_model.test(p)
r
```

Out[295]:

(24671, 0.9229459689514005, 0.9229459689514005)

In [296]:

```
plot_confusion_matrix(
    m.inference,
    X_test, y_test,
    labels=INTENT_NAMES + ['none'],
    normalize='pred',
    xticks_rotation='vertical'
); plt.title('fasttext with default params, preprocessed text')
```

Out[296]:

Text(0.5, 1.0, 'fasttext with default params, preprocessed text')

fasttext train dataset size vs perf

In [146]:

```
# redefine data

X_train, X_test, y_train, y_test = train_test_split(X_all, y_all, test_size=.15, random_
state=1337)

len(X_train), len(X_test)
```

Out[146]:

(104848, 18503)

In [150]:

```
train_pp = [preprocess_fasttext_full(x) for x in X_train.to_list()]
test_pp = [preprocess_fasttext_full(x) for x in X_test.to_list()]

ps_df = []

for s in range(1000, len(X_train), 1000):
    print(s)

m = FasttextClassifier(preprocess_input=preprocess_fasttext_full).fit(
        train_pp[:s],
        y_train[:s].to_list()
    )
```

```
    with get_fasttext_dataset_path(test_pp, y_test.to_list()) as p:
        rs = m._ft_model.test_label(p)
        ps = [rs[f'__label__{i}']['precision'] for i in INTENT_NAMES + ['none']]
        ps_df.append(ps)

ps_df = pd.DataFrame(ps_df)
ps_df 1000
2000
3000
4000
5000
6000
7000
8000
9000
10000
11000
12000
13000
14000
15000
16000
17000
18000
19000
20000
21000
22000
23000
24000
25000
26000
27000
28000
29000
30000
31000
32000
33000
34000
35000
36000
37000
38000
39000
40000
41000
42000
43000
44000
45000
46000
47000
48000
49000
50000
51000
52000
53000
54000
55000
56000
57000
58000
59000
60000
61000
62000
63000
64000
```

```
65000
66000
67000
68000
69000
70000
71000
72000
73000
74000
75000
76000
77000
78000
79000
80000
81000
82000
83000
84000
85000
86000
87000
88000
89000
90000
91000
92000
93000
94000
95000
96000
97000
98000
99000
100000
101000
102000
103000
104000
```

Out[150]:

|   | 0 | 1 | 2 | 3 | 4 | 5 |
|---|---|---|---|---|---|---|
| 0 | 0.000000 | 0.634615 | 0.517544 | NaN | 0.357278 | 0.727443 |
| 1 | NaN | 0.702564 | 0.452896 | NaN | 0.835749 | 0.764764 |
| 2 | 0.000000 | 0.620527 | 0.668802 | 0.986395 | 0.790308 | 0.822352 |
| 3 | 0.909091 | 0.687444 | 0.840757 | 0.875421 | 0.827306 | 0.878301 |
| 4 | 0.847826 | 0.697595 | 0.855839 | 0.880995 | 0.827356 | 0.899146 |
| ... | ... | ... | ... | ... | ... | ... |
| 99 | 0.727626 | 0.783193 | 0.917725 | 0.924285 | 0.856000 | 0.945774 |
| 100 | 0.741935 | 0.786391 | 0.913617 | 0.924888 | 0.860927 | 0.944318 |
| 101 | 0.746939 | 0.778501 | 0.914958 | 0.924930 | 0.866766 | 0.945287 |
| 102 | 0.728682 | 0.776329 | 0.918935 | 0.924022 | 0.866914 | 0.946359 |
| 103 | 0.726582 | 0.764893 | 0.910501 | 0.924318 | 0.867560 | 0.948566 |

104 rows × 6 columns

In [151]:

```
ps_df['dataset_size'] = ps_df.index.map(lambda x: (x + 1) * 1000)
```

In [161]:

```
ps_df.rename(columns={i: n for i, n in enumerate(INTENT_NAMES+['none'])}, inplace=True)
``` ps_df

Out[161]:

| | announce | apology | ask_help | set_up_meeting | thank | none | dataset_size |
|---|---|---|---|---|---|---|---|
| 0 | 0.000000 | 0.634615 | 0.517544 | NaN | 0.357278 | 0.727443 | 1000 |
| 1 | NaN | 0.702564 | 0.452896 | NaN | 0.635749 | 0.784764 | 2000 |
| 2 | 0.000000 | 0.620527 | 0.668802 | 0.986395 | 0.790308 | 0.822352 | 3000 |
| 3 | 0.909091 | 0.687444 | 0.840757 | 0.875421 | 0.827306 | 0.878301 | 4000 |
| 4 | 0.847826 | 0.697595 | 0.855839 | 0.880995 | 0.827356 | 0.899146 | 5000 |
| ... | ... | ... | ... | ... | ... | ... | ... |
| 99 | 0.727626 | 0.783193 | 0.917725 | 0.924285 | 0.856000 | 0.945774 | 100000 |
| 100 | 0.741935 | 0.786391 | 0.913617 | 0.924888 | 0.860927 | 0.944318 | 101000 |
| 101 | 0.746939 | 0.778601 | 0.914958 | 0.924930 | 0.866766 | 0.945287 | 102000 |
| 102 | 0.728682 | 0.778329 | 0.918935 | 0.924022 | 0.866914 | 0.946359 | 103000 |
| 103 | 0.726562 | 0.764893 | 0.910501 | 0.924318 | 0.867560 | 0.948566 | 104000 |

104 rows × 7 columns

In [165]:

ps_df.plot(x='dataset_size'); plt.title('fasttext model precision by dataset size')

Out[165]:

Text(0.5, 1.0, 'fasttext model precision by dataset size')

⚡NB: no improvement after >20k samples in training set (at least w/o tuning)

In [205]:

```
def get_fasttext_model_params(m):
    return {
        n: getattr(m, n).name if n == 'loss' else getattr(m, n)
        for n in [
            'lr', 'dim', 'ws', 'epoch', 'minCount', 'minCountLabel',
            'minn', 'maxn', 'neg', 'wordNgrams', 'loss', 'bucket',
            'lrUpdateRate', 't',
        ]
    }
```

In [197]:

```
try autotune def train_fasttext_autotuned(X, y, ppfn=preprocess_fasttext_minimal):
    X_train, X_val, y_train, y_val = train_test_split(
        X.map(ppfn), y,
        test_size=.2, random_state=1337)

with get_fasttext_dataset_path(X_val, y_val) as val_data_path:
        m = FasttextClassifier(preprocess_input=ppfn).fit(
            X_train, y_train,
            autotuneValidationFile=val_data_path,
            autotuneDuration=300
        )

return m, get_fasttext_model_params(m._ft_model)
```

```
m, _ = train_fasttext_autotuned(X_train, y_train)
conf_mat(m.inference, X_test, y_test, 'fasttext autotuned')
```

In [206]:

```
best_params = get_fasttext_model_params(m._ft_model)
best_params
```

Out[206]:

```
{'lr': 0.5749665254632529,
 'dim': 51,
 'ws': 5,
 'epoch': 10,
 'minCount': 1,
 'minCountLabel': 0,
 'minn': 2,
 'maxn': 5,
 'neg': 5,
 'wordNgrams': 3,
 'loss': 'softmax',
 'bucket': 1337371,
 'lrUpdateRate': 100,
 't': 0.0001}
``` fasttext vs preprocessing

In [252]:

```
def exp_preprocessing_methods(X_train, y_train, X_test, y_test):
    pp_fns = [
        preprocess_fasttext_full,
        preprocess_fasttext_fake_tokenize,
        preprocess_fasttext_minimal
    ]

for ppfn in pp_fns:
        m = FasttextClassifier(preprocess_input=ppfn).fit(
            [ppfn(x) for x in X_train.to_list()],
            y_train.to_list(),
            **best_params
        )

plot_confusion_matrix(
            m.inference,
            [ppfn(x) for x in X_test.to_list()], y_test,
            labels=ALL_LABELS,
            normalize='pred',
            xticks_rotation='vertical'
        ); plt.title(f'fasttext/preprocessing: {ppfn.__name__}')

exp_preprocessing_methods(X_train, y_train, X_test, y_test)
```

⚡NB: small (but possibly significant) difference between preprocessing methods; best is `preprocess_fasttext_full`.

Preprocess all data

```
In [358]:

X_all_pp = X_all.map(preprocess_fasttext_full)

X_train_pp, X_test_pp, y_train, y_test = train_test_split(X_all_pp, y_all, test_size=.15
, random_state=1337)

len(X_train_pp), len(X_test_pp)

Out[358]:

(104848, 18503)
```

Error analysis

```
In [209]:

m = FasttextClassifier(preprocess_input=preprocess_fasttext_full).fit(
    X_train_pp.to_list(),
    y_train.to_list(),
    **best_params
)
with get_fasttext_dataset_path(X_test_pp.to_list(), y_test.to_list()) as p:
    print(m._ft_model.test(p))
    print(m._ft_model.test_label(p))

(18503, 0.9227692806571908, 0.9227692806571908)
{'__label__announce': {'precision': 0.7127272727272728, 'recall': nan, 'f1score': 1.42545
45454545455}, '__label__apology': {'precision': 0.7846930193439865, 'recall': nan, 'f1sco
re': 1.569386038687973}, '__label__thank': {'precision': 0.8716617210682492, 'recall': na
n, 'f1score': 1.7433234421364985}, '__label__set_up_meeting': {'precision': 0.92351274787
53541, 'recall': nan, 'f1score': 1.8470254957507082}, '__label__ask_help': {'precision':
0.9366852886405959, 'recall': nan, 'f1score': 1.8733705772811917}, '__label__none': {'pre
cision': 0.9444579780755177, 'recall': nan, 'f1score': 1.8889159561510354}}

In [309]:

def mk_err_an_df(X_test, y_test, predss):
    return pd.DataFrame(
        [
            cols for cols in zip(
                X_test,
                *[ps for _, ps in predss],
                y_test
            )
        ],
        columns=['sentence', *[n for n, _ in predss], 'y']
    )

err_an = mk_err_an_df(
    X_test, y_test, [
        ('fasttext', m.inference.predict(X_test_pp)),
        ('use4', UseModelWrapper(use_m).predict(X_test))
    ])

In [218]:

announce_fns = err_an[(err_an['y'] == 'announce') & (err_an['fasttext'] != 'announce')]

In [220]:

announce_fns.to_csv('./announce_fns.csv')

In [224]:

err_an[(err_an['y'] != 'announce') & (err_an['fasttext'] == 'announce')].to_csv('./annou
nce_fps.csv')
```

In [228]:

'We have another virtual Alejandro tour tomorrow!' in neutral_62500['sentence']

Out[228]:

False

In [230]:

all_intents_multilabel[all_intents_multilabel['sentence'] == 'We have another virtual Alejandro tour tomorrow!']

Out[230]:

|  | sentence | label |
|---|---|---|
| 16779 | We have another virtual Alejandro tour tomorrow! | announce |

Precision/recall

In [286]:

```
def get_metrics(preds, pred_col_name):
    cols = ['target', 'total', 'tps', 'tns', 'fps', 'fns', 'P', 'R', 'F1']

df = pd.DataFrame([
        (
            f'intent_{name}',
            len(preds[preds['y'] == name]),
            (tps := len(preds[(preds['y'] == name) & (preds[pred_col_name] == name)])),
            (tns := len(preds[(preds['y'] != name) & (preds[pred_col_name] != name)])),
            (fps := len(preds[(preds['y'] != name) & (preds[pred_col_name] == name)])),
            (fns := len(preds[(preds['y'] == name) & (preds[pred_col_name] != name)])),
            (P := tps / ((tps + fps) + 1e-20)),
            (R := tps / ((tps + fns) + 1e-20)),
            2 * (P * R) / ((P + R) + 1e-20)
        )
        for name in INTENT_NAMES
    ], columns=cols)

return df.append(pd.DataFrame([
        (
            'micro_average',
            df['total'].sum(),
            (tps := df['tps'].sum()),
            (tns := df['tns'].sum()),
            (fps := df['fps'].sum()),
            (fns := df['fns'].sum()),
            (P := tps / ((tps + fps) + 1e-20)),
            (R := tps / ((tps + fns) + 1e-20)),
            2 * (P * R) / ((P + R) + 1e-20)
        ),
        (
            'macro_average',
            None, None, None, None, None,
            (P := df['P'].mean()),
            (R := df['R'].mean()),
            2 * (P * R) / ((P + R) + 1e-20)
        ),
    ], columns=cols))
```

In [315]:

get_metrics(err_an, 'fasttext')

Out[315]:

| target | total | tps | tns | fps | fns | P | R | F1 |
|---|---|---|---|---|---|---|---|---|

|   | target | total | tps | tns | fps | fns | P | R | F1 |
|---|---|---|---|---|---|---|---|---|---|
| 0 | intent_announce | 347.0 | 188.0 | 18097.0 | 62.0 | 159.0 | 0.743083 | 0.541787 | 0.626667 |
| 1 | intent_apology | 1130.0 | 932.0 | 17114.0 | 259.0 | 198.0 | 0.782536 | 0.824779 | 0.803102 |
| 2 | intent_ask_help | 1605.0 | 1500.0 | 16773.0 | 125.0 | 105.0 | 0.923077 | 0.934579 | 0.928793 |
| 3 | intent_set_up_meeting | 1731.0 | 1653.0 | 16638.0 | 134.0 | 78.0 | 0.925014 | 0.954939 | 0.939738 |
| 4 | intent_thank | 1327.0 | 1164.0 | 17004.0 | 172.0 | 163.0 | 0.871257 | 0.877167 | 0.874202 |
| 0 | micro_average | 6140.0 | 5437.0 | 85626.0 | 755.0 | 703.0 | 0.878068 | 0.885505 | 0.881771 |
| 1 | macro_average | NaN | NaN | NaN | NaN | NaN | 0.848993 | 0.826650 | 0.837673 |

```
In [289]:
get_metrics(err_an, 'use4')
Out[289]:
```

|   | target | total | tps | tns | fps | fns | P | R | F1 |
|---|---|---|---|---|---|---|---|---|---|
| 0 | intent_announce | 347.0 | 320.0 | 17119.0 | 1037.0 | 27.0 | 0.235814 | 0.922190 | 0.375587 |
| 1 | intent_apology | 1130.0 | 138.0 | 17319.0 | 54.0 | 992.0 | 0.718750 | 0.122124 | 0.208775 |
| 2 | intent_ask_help | 1605.0 | 0.0 | 16898.0 | 0.0 | 1605.0 | 0.000000 | 0.000000 | 0.000000 |
| 3 | intent_set_up_meeting | 1731.0 | 0.0 | 16772.0 | 0.0 | 1731.0 | 0.000000 | 0.000000 | 0.000000 |
| 4 | intent_thank | 1327.0 | 1297.0 | 16107.0 | 1069.0 | 30.0 | 0.548183 | 0.977393 | 0.702410 |
| 0 | micro_average | 6140.0 | 1755.0 | 84215.0 | 2160.0 | 4385.0 | 0.448276 | 0.285831 | 0.349080 |
| 1 | macro_average | NaN | NaN | NaN | NaN | NaN | 0.300549 | 0.404341 | 0.344804 |

NB: USE model is actually pretty bad

```
In [302]:
def fasttext_perf_vs_pos_samples(X_train, y_train, X_test, y_test):
    y_train_pos = y_train[y_train != 'none']
    X_train_pos = X_train[y_train != 'none']

X_train_neg = X_train[y_train == 'none']

assert not 'none' in y_train_pos.value_counts().keys()

eval_rs = []

for pos_ratio_ in range(5, 101, 5):
        pos_ratio = pos_ratio_ / 100.0

X_tr_pos = X_train_pos.sample(frac=pos_ratio, random_state=1337)
        X_tr = pd.concat([X_tr_pos, X_train_neg])
        y_tr = y_train[X_tr.index]

print(f'training with {len(X_tr_pos)} pos samples, {len(X_tr)} total')

m = FasttextClassifier(preprocess_input=preprocess_fasttext_full).fit(
            X_tr.to_list(), y_tr.to_list(),
            **best_params)

eval_r = get_metrics(
            mk_err_an_df(X_test, y_test, [('y_pred', m.inference.predict(X_test))]),
            'y_pred')

eval_rs.append((
            pos_ratio,
            len(X_tr_pos),
            len(X_tr),
            *eval_r.set_index('target').T['micro_average'].values[1:]
        ))
```

```python
    return pd.DataFrame(
        eval_rs,
        columns=['pos_ratio', 'pos_samples', 'total_samples', 'tps', 'tns', 'fps', 'fns'
, 'P', 'R', 'F1'])

eval_rs = fasttext_perf_vs_pos_samples(X_train_pp, y_train, X_test_pp, y_test)
```

```
training with 1728 pos samples, 72014 total
training with 3456 pos samples, 73742 total
training with 5184 pos samples, 75470 total
training with 6912 pos samples, 77198 total
training with 8640 pos samples, 78926 total
training with 10369 pos samples, 80655 total
training with 12097 pos samples, 82383 total
training with 13825 pos samples, 84111 total
training with 15553 pos samples, 85839 total
training with 17281 pos samples, 87567 total
training with 19009 pos samples, 89295 total
training with 20737 pos samples, 91023 total
training with 23465 pos samples, 92751 total
training with 24193 pos samples, 94479 total
training with 25922 pos samples, 96208 total
training with 27650 pos samples, 97936 total
training with 29378 pos samples, 99664 total
training with 31106 pos samples, 101392 total
training with 32834 pos samples, 103120 total
training with 34562 pos samples, 104848 total
```

In [383]:

```python
eval_rs.loc[:, ['pos_samples', 'P', 'R', 'F1']].plot(x='pos_samples')
plt.title('fasttext model by number of positive samples')
```

Out[383]:

Text(0.5, 1.0, 'fasttext model by number of positive samples')

In [384]:

```python
def fasttext_perf_vs_neg_samples(X_train, y_train, X_test, y_test):
    y_train_pos = y_train[y_train != 'none']
    X_train_pos = X_train[y_train != 'none']
    X_train_neg = X_train[y_train == 'none']
    assert not 'none' in y_train_pos.value_counts().keys()

eval_rs = []

for ratio_ in range(5, 101, 5):
        ratio = ratio_ / 100.0

X_tr_neg = X_train_neg.sample(frac=ratio, random_state=1337)
        X_tr = pd.concat([X_tr_neg, X_train_pos])
        y_tr = y_train[X_tr.index]

print(f'training with {len(X_tr_neg)} neg samples, {len(X_tr)} total')

m = FasttextClassifier(preprocess_input=preprocess_fasttext_full).fit(
            X_tr.to_list(), y_tr.to_list(),
            **best_params)

eval_r = get_metrics(
            mk_err_an_df(X_test, y_test, [('y_pred', m.inference.predict(X_test))]),
            'y_pred')

eval_rs.append((
            ratio,
            len(X_tr_neg),
            len(X_tr),
            *eval_r.set_index('target').T['micro_average'].values[1:]
```

```python
        }}
    return pd.DataFrame(
        eval_rs,
        columns=['ratio', 'neg_samples', 'total_samples', 'tps', 'tns', 'fps', 'fns', 'P
', 'R', 'F1'])

neg_ratio_eval_rs = fasttext_perf_vs_neg_samples(X_train_pp, y_train, X_test_pp, y_test)
```

```
training with 3514 neg samples, 38076 total
training with 7029 neg samples, 41591 total
training with 10543 neg samples, 45105 total
training with 14057 neg samples, 48619 total
training with 17572 neg samples, 52134 total
training with 21086 neg samples, 55648 total
training with 24600 neg samples, 59162 total
training with 28114 neg samples, 62676 total
training with 31629 neg samples, 66191 total
training with 35143 neg samples, 69705 total
training with 38657 neg samples, 73219 total
training with 42172 neg samples, 76734 total
training with 45686 neg samples, 80248 total
training with 49200 neg samples, 83762 total
training with 52714 neg samples, 87276 total
training with 56229 neg samples, 90791 total
training with 59743 neg samples, 94305 total
training with 63257 neg samples, 97819 total
training with 66772 neg samples, 101334 total
training with 70286 neg samples, 104848 total
```

In [385]:

```python
neg_ratio_eval_rs.loc[:, ['neg_samples', 'P', 'R', 'F1']].plot(x='neg_samples')
plt.title('fasttext model by number of negative samples')
```

Out[385]:

Text(0.5, 1.0, 'fasttext model by number of negative samples')

In [389]:

```python
def fasttext_perf_vs_all_samples(X_train, y_train, X_test, y_test):
    eval_rs = []

for ratio_ in range(3, 101, 3):
        ratio = ratio_ / 100.0

X_tr = X_train.sample(frac=ratio, random_state=1337)
        y_tr = y_train[X_tr.index]

print(f'training with {len(X_tr)} samples')

m = FasttextClassifier(preprocess_input=preprocess_fasttext_full).fit(
            X_tr.to_list(), y_tr.to_list(),
            **best_params)

eval_r = get_metrics(
            mk_err_an_df(X_test, y_test, [('y_pred', m.inference.predict(X_test))]),
            'y_pred')

eval_rs.append((
            ratio,
            len(X_tr),
            *eval_r.set_index('target').T['micro_average'].values[1:]
        ))

return pd.DataFrame(
        eval_rs,
        columns=['ratio', 'total_samples', 'tps', 'tns', 'fps', 'fns', 'P', 'R', 'F1'])
```

```
all_ratio_eval_rs = fasttext_perf_vs_all_samples(X_train_pp, y_train, X_test_pp, y_test)
```

```
training with 3145 samples
training with 6291 samples
training with 9436 samples
training with 12582 samples
training with 15727 samples
training with 18873 samples
training with 22018 samples
training with 25164 samples
training with 28309 samples
training with 31454 samples
training with 34600 samples
training with 37745 samples
training with 40891 samples
training with 44036 samples
training with 47182 samples
training with 50327 samples
training with 53472 samples
training with 56618 samples
training with 59763 samples
training with 62909 samples
training with 66054 samples
training with 69200 samples
training with 72345 samples
training with 75491 samples
training with 78636 samples
training with 81781 samples
training with 84927 samples
training with 88072 samples
training with 91218 samples
training with 94363 samples
training with 97509 samples
training with 100654 samples
training with 103800 samples
```

In [391]:

```
all_ratio_eval_rs.loc[:, ['total_samples', 'P', 'R', 'F1']].plot(x='total_samples')
plt.title('fasttext model by total samples')
```

Out[391]:

Text(0.5, 1.0, 'fasttext model by total samples')

In [392]:

```
len(y_all[y_all != 'none']) / len(y_all)
```

Out[392]:

0.32996895039359225

Fix announce dataset

In [ ]:

APPENDIX 2

(sheets follow)

```
In [1]:
from typing import List, Any, Tuple
import pandas as pd
import numpy as np
import fasttext, sys, os if not (oracle_root := os.path.split(os.getcwd())[0]) in sys.path:
    sys.path.append(oracle_root)

from oracle.model.fasttext_wrapper.classifier import FasttextClassifier, get_fasttext_dataset_path
from oracle.model.fasttext_wrapper.preprocessing import preprocess_fasttext_full, preprocess_fasttext_minimal, preprocess_fasttext_fake_tokenize from sklearn.model_selection import train_test_split
from sklearn.metrics import confusion_matrix, plot_confusion_matrix, precision_recall_curve from matplotlib import pyplot as plt
import seaborn as sns %matplotlib inline In [2]:
def conf_mat(m, X_test, y_test, title):
    plot_confusion_matrix(
        m, X_test, y_test,
        labels=ALL_LABELS,
        # set to 'true' to show recall
        # 'pred' shows precision
        normalize='pred',
        xticks_rotation='vertical'
    ); plt.title(title)

In [3]:
def load_xlsx_raw(
    path: str,
    label_col_name='label',
    xls_sheet_name='Final Judgments',
    only_Grammarly=False
):
    xls = pd.read_excel(path, sheet_name=xls_sheet_name)

label_col = xls['Grammarly'] if only_Grammarly else \
        xls['Grammarly'].fillna(xls[xls.columns[2]]) \
        if 'Grammarly' in xls.columns \
        else xls[xls.columns[2]]

return pd.concat(
        [
            xls['source_id'],
            xls['sentence'],
            label_col.rename(label_col_name)
        ],
        axis=1
    )

assert (xls := load_xlsx_raw('../data/intents/first5/xlsx/thank-1.xlsx')).shape == (1000, 3,) and \
    list(xls.columns) == ['source_id', 'sentence', 'label']

assert (xls := load_xlsx_raw('../data/intents/first5/xlsx/announce-2.xlsx', only_Grammarly=True))[xls['source_id'] == 8721]['label'].isna().values[0]

In [4]:
```

```python
def fold_binary(dfs: List[pd.DataFrame], label_col_name='label'):
    r = None for df in dfs:
        if r is None: r = df
        else:
            r = pd.merge(
                r, df,
                how='outer', on=['source_id', 'sentence'], validate='one_to_one',
                suffixes=('', '_')
            )

# overwrite left labels with right labels
            r[r.columns[2]] = r[r.columns[3]].fillna(r[r.columns[2]])

# remove right labels
            del r[r.columns[3]]

del r['source_id']
    return r assert fold_binary([
    load_xlsx_raw(p) for p in ['../data/intents/first5/xlsx/thank-1.xlsx']]).shape == (1
000, 2,)

assert fold_binary([load_xlsx_raw(p) for p in [
    '../data/intents/first5/xlsx/set_up_meeting-1.xlsx',
    '../data/intents/first5/xlsx/set_up_meeting-2.xlsx',
    '../data/intents/first5/xlsx/set_up_meeting-3.xlsx'
]]).shape == (12536, 2,)
```

In [5]:

```python
def preprocess_binary(df: pd.DataFrame):
    certain_labels = df[df['label'].isin(set([0, 1]))].dropna()
    dupes = set((vcts := certain_labels['source_id'].value_counts())[vcts > 1].index)
    return certain_labels[~certain_labels['source_id'].isin(dupes)]

assert preprocess_binary(load_xlsx_raw('../data/intents/first5/xlsx/apology-2.xlsx')).sha
pe == (11923, 3,)

assert preprocess_binary(load_xlsx_raw('../data/intents/first5/xlsx/thank-2.xlsx')).shape
== (11486, 3)
```

In [6]:

```python
INTENT_NAMES = [
    'announce', 'apology', 'ask_help', 'set_up_meeting', 'thank'
]

ALL_LABELS = INTENT_NAMES + ['none']
```

In [7]:

```python
neutral_62500 = pd.concat([
    pd.read_csv('../data/intents/first5/neutral_62500_anoned.csv', header=None)[1].renam
e('sentence'),
], axis=1)

neutral_62500['label'] = 0 neutral_62500
```

Out[7]:

| | sentence | label |
|---|---|---|
| 0 | BJ Services: 495 | 0 |
| 1 | Box style 7 | 0 |
| 2 | Bar Tracking#17AW12345678001234 - [25] ngios | 0 |

|   | sentence | label |
|---|---|---|
| 3 | ~~If you are not changing ink colors, these can...~~ | ~~0~~ |
| 4 | leads plans and manages the execution of new e... | 0 |
| ... | ... | ... |
| 62495 | #include<cstdio> | 0 |
| 62496 | The latter. | 0 |
| 62497 | Tropical storm force winds are expected to rem... | 0 |
| 62498 | ███████████████████ | 0 |
| 62499 | ███████████████████ | 0 |

62500 rows × 2 columns

In [8]:
```python
def load_announce_xlsx_raw(
    path: str,
    label_col_name='label',
    xls_sheet_name='Final Judgments',
):
    xls = pd.read_excel(path, sheet_name=xls_sheet_name)
    xls = xls[(xls['Appen judgment sum'] == 2) & ~(xls['Grammarly'].isna())]
    label_col = xls['Grammarly']

return pd.concat(
        [
            xls['source_id'],
            xls['sentence'],
            label_col.rename(label_col_name)
        ],
        axis=1
    )

def load_announce_sheet_2(path):
    return preprocess_binary(load_announce_xlsx_raw(path))

assert load_announce_sheet_2('../data/intents/first5/xlsx/announce-2.xlsx')['label'].value
_counts().to_list() == [2179, 1968] #[4882, 2215]
```

In [9]:
```python
all_intents_binary = [
    (
        intent,
        fold_binary([
            # 2nd announce dataset is special
            load_announce_sheet_2(p) \
                if intent == 'announce' and i == 2 else \
                preprocess_binary(load_xlsx_raw(p))
            for i in [1, 2, 3]
            if os.path.exists((p := f'../data/intents/first5/xlsx/{intent}-{i}.xlsx'))
        ])
    )
    for intent in INTENT_NAMES
]

assert len(all_intents_binary) == 5 pd.DataFrame([(name, df['label'].value_counts().sort_index().values, len(df)) for name,
df in all_intents_binary])
```

Out[9]:

|   | 0 | 1 | 2 |
|---|---|---|---|
| 0 | announce | [2541, 2106] | 4647 |
| 1 | apology | [4571, 7849] | 12420 |

|   |              |   0   |   1   |   2   |
|---|--------------|-------|-------|-------|
|   | apology      | [4671, 7849] | 12420 |
| 2 | ask_help     | [1858, 10482] | 12340 |
| 3 | set_up_meeting | [1210, 11326] | 12536 |
| 4 | thank        | [3960, 8526] | 12486 |

In [10]:

```
def combine_multilabel(dfs: Tuple[str, List[Any]], neutral_label='none'):
    return pd.concat(
        [
            pd.concat(
                [
                    df['sentence'],
                    df['label'].map(lambda x: name if x == 1 else neutral_label).rename('label')
                ],
                axis=1
            )
            for name, df in dfs
        ],
        ignore_index=True,
        axis=0
    )

all_intents_multilabel = combine_multilabel(
    [
        *all_intents_binary,
        ('none', neutral_62500)
    ]
).sample(frac=1, random_state=1337).reset_index(drop=True)

all_intents_multilabel['label'].value_counts()
```

Out[10]:

```
none              76640
set_up_meeting    11326
ask_help          10482
thank              8526
apology            7849
announce           2106
Name: label, dtype: int64
```

In [11]:

```
all_intents_multilabel[:10]
```

Out[11]:

|   | sentence | label |
|---|----------|-------|
| 0 | Can you please read the below and advise. | ask_help |
| 1 | I think we need to apologize to her.. PLease a... | none |
| 2 | responding to this email address, my apology i... | none |
| 3 | In order to forgive someone, there must be an ... | none |
| 4 | Any help with this is appreciated. | ask_help |
| 5 | ████████████████████████████ | none |
| 6 | 8,623.88 | none |
| 7 | But if you have a cancelation in the next week... | set_up_meeting |
| 8 | I know that you have a lot of work to do in th... | apology |
| 9 | I am available anytime for the meeting. | set_up_meeting |

In [12]:

```
X_all, y_all = all_intents_multilabel['sentence'], all_intents_multilabel['label']

X_train, X_test, y_train, y_test = train_test_split(X_all, y_all, test_size=.15, random_
state=1337)

X_all_pp = X_all.map(preprocess_fasttext_full)

X_train_pp, X_test_pp, y_train, y_test = train_test_split(X_all_pp, y_all, test_size=.15
, random_state=1337)

len(X_train), len(X_test), len(X_train_pp), len(X_test_pp)
Out[12]:
(99389, 17540, 99389, 17540)

In [13]:
best_fasttext_params = {
    'lr': 0.5740665254632529,
    'dim': 51,
    'ws': 5,
    'epoch': 10,
    'minCount': 1,
    'minCountLabel': 0,
    'minn': 2,
    'maxn': 5,
    'neg': 5,
    'wordNgrams': 3,
    'loss': 'softmax',
    'bucket': 1337371,
    'lrUpdateRate': 100,
    't': 0.0001
}

In [14]:
def mk_err_an_df(X_test, y_test, predss):
    return pd.DataFrame(
        [
            cols for cols in zip(
                X_test,
                *[ps for _, ps in predss],
                y_test
            )
        ],
        columns=['sentence', *[n for n, _ in predss], 'y']
    )

In [15]:
def get_metrics(preds, pred_col_name):
    cols = ['target', 'total', 'tps', 'tns', 'fps', 'fns', 'P', 'R', 'F1']

df = pd.DataFrame([
        (
            f'intent_{name}',
            len(preds[preds['y'] == name]),
            (tps := len(preds[(preds['y'] == name) & (preds[pred_col_name] == name)])),
            (tns := len(preds[(preds['y'] != name) & (preds[pred_col_name] != name)])),
            (fps := len(preds[(preds['y'] != name) & (preds[pred_col_name] == name)])),
            (fns := len(preds[(preds['y'] == name) & (preds[pred_col_name] != name)])),
            (P := tps / ((tps + fps) + 1e-20)),
            (R := tps / ((tps + fns) + 1e-20)),
            2 * (P * R) / ((P + R) + 1e-20)
        )
        for name in INTENT_NAMES
    ], columns=cols)

return df.append(pd.DataFrame([
        (
```

```
                'micro_average',
                df['total'].sum(),
                (tps := df['tps'].sum()),
                (tns := df['tns'].sum()),
                (fps := df['fps'].sum()),
                (fns := df['fns'].sum()),
                (P := tps / ((tps + fps) + 1e-20)),
                (R := tps / ((tps + fns) + 1e-20)),
                2 * (P * R) / ((P + R) + 1e-20)
            ),
            (
                'macro_average',
                None, None, None, None, None,
                (P := df['P'].mean()),
                (R := df['R'].mean()),
                2 * (P * R) / ((P + R) + 1e-20)
            ),
        ], columns=cols))

In [35]:
m = FasttextClassifier(preprocess_input=preprocess_fasttext_full).fit(
    X_train_pp.to_list(), y_train.to_list(),
    **best_fasttext_params
)

get_metrics(mk_err_an_df(X_test_pp, y_test, [('fasttext', m.inference.predict(X_test_pp.
to_list()))]), 'fasttext')

Out[35]:
```

|   | target | total | tps | tns | fps | fns | P | R | F1 |
|---|---|---|---|---|---|---|---|---|---|
| 0 | intent_announce | 348.0 | 217.0 | 17552.0 | 82.0 | 131.0 | 0.725753 | 0.623563 | 0.670788 |
| 1 | intent_apology | 1155.0 | 993.0 | 16547.0 | 280.0 | 162.0 | 0.780047 | 0.859740 | 0.817957 |
| 2 | intent_ask_help | 1576.0 | 1503.0 | 16303.0 | 103.0 | 73.0 | 0.935866 | 0.953680 | 0.944689 |
| 3 | intent_set_up_meeting | 1765.0 | 1675.0 | 16076.0 | 141.0 | 90.0 | 0.922357 | 0.949008 | 0.935493 |
| 4 | intent_thank | 1239.0 | 1103.0 | 16573.0 | 170.0 | 136.0 | 0.866457 | 0.890234 | 0.878185 |
| 0 | micro_average | 6083.0 | 5491.0 | 83051.0 | 776.0 | 592.0 | 0.876177 | 0.902680 | 0.889231 |
| 1 | macro_average | NaN | NaN | NaN | NaN | NaN | 0.846096 | 0.855245 | 0.850646 |

Save ft model

```
In [38]:
m._ft_model.save_model('./intent-2020-08-28.ftz')

In [40]:
os.path.getsize('./intent-2020-08-28.ftz')

Out[40]:
283548255

In [16]:
def eval_model(m, X_test, y_test, title):
    conf_mat(m, X_test, y_test, title)

return get_metrics(
        mk_err_an_df(
            X_test_pp, y_test,
            [('q', m.predict(X_test_pp.to_list()))]
        ), 'q')
```

```
In [41]:
eval_model(m.inference, X_test_pp, y_test, 'fasttext best updated announce data')
Out[41]:
```

| | target | total | tps | tns | fps | fns | P | R | F1 |
|---|---|---|---|---|---|---|---|---|---|
| 0 | intent_announce | 348.0 | 217.0 | 17552.0 | 82.0 | 131.0 | 0.725753 | 0.623563 | 0.670788 |
| 1 | intent_apology | 1155.0 | 993.0 | 16547.0 | 280.0 | 162.0 | 0.780047 | 0.859740 | 0.817957 |
| 2 | intent_ask_help | 1576.0 | 1503.0 | 16303.0 | 103.0 | 73.0 | 0.935866 | 0.953680 | 0.944689 |
| 3 | intent_set_up_meeting | 1765.0 | 1675.0 | 16076.0 | 141.0 | 90.0 | 0.922357 | 0.949008 | 0.935493 |
| 4 | intent_thank | 1239.0 | 1103.0 | 16573.0 | 170.0 | 136.0 | 0.866457 | 0.890234 | 0.878185 |
| 0 | micro_average | 6083.0 | 5491.0 | 83051.0 | 776.0 | 592.0 | 0.876177 | 0.902680 | 0.889231 |
| 1 | macro_average | NaN | NaN | NaN | NaN | NaN | 0.848096 | 0.855245 | 0.850646 |

```
In [43]:
m._ft_model.quantize()

In [44]:
eval_model(m.inference, X_test_pp, y_test, 'fasttext best updated announce data')
Out[44]:
```

| | target | total | tps | tns | fps | fns | P | R | F1 |
|---|---|---|---|---|---|---|---|---|---|
| 0 | intent_announce | 348.0 | 311.0 | 16839.0 | 795.0 | 37.0 | 0.281193 | 0.893678 | 0.427785 |
| 1 | intent_apology | 1155.0 | 1150.0 | 16120.0 | 707.0 | 5.0 | 0.619278 | 0.995671 | 0.763612 |
| 2 | intent_ask_help | 1576.0 | 1566.0 | 16137.0 | 269.0 | 10.0 | 0.853406 | 0.993655 | 0.918206 |
| 3 | intent_set_up_meeting | 1765.0 | 1761.0 | 15947.0 | 270.0 | 4.0 | 0.867061 | 0.997734 | 0.927819 |
| 4 | intent_thank | 1239.0 | 1235.0 | 16116.0 | 627.0 | 4.0 | 0.663265 | 0.996772 | 0.796517 |
| 0 | micro_average | 6083.0 | 6023.0 | 81159.0 | 2668.0 | 60.0 | 0.693016 | 0.990136 | 0.815351 |
| 1 | macro_average | NaN | NaN | NaN | NaN | NaN | 0.656841 | 0.975502 | 0.785067 | appensum==2

```
In [20]:
m = FasttextClassifier(preprocess_input=preprocess_fasttext_full).fit(
    X_train_pp.to_list(), y_train.to_list(),
    **best_fasttext_params
)
eval_model(m.inference, X_test_pp, y_test, 'fasttext best announce appensum==2')
Out[20]:
```

| | target | total | tps | tns | fps | fns | P | R | F1 |
|---|---|---|---|---|---|---|---|---|---|
| 0 | intent_announce | 340.0 | 243.0 | 17151.0 | 49.0 | 97.0 | 0.832192 | 0.714706 | 0.768987 |
| 1 | intent_apology | 1211.0 | 973.0 | 16132.0 | 197.0 | 238.0 | 0.831624 | 0.803468 | 0.817304 |
| 2 | intent_ask_help | 1548.0 | 1463.0 | 15872.0 | 120.0 | 85.0 | 0.924195 | 0.945090 | 0.934526 |
| 3 | intent_set_up_meeting | 1676.0 | 1606.0 | 15724.0 | 140.0 | 70.0 | 0.919817 | 0.958234 | 0.938632 |
| 4 | intent_thank | 1304.0 | 1143.0 | 16027.0 | 109.0 | 161.0 | 0.951714 | 0.876534 | 0.863946 |

|   | target | total | tps | tms | fps | fns | P | R | F1 |
|---|---|---|---|---|---|---|---|---|---|
| 0 | micro_average | 5078.0 | 5428.0 | 80916.0 | 705.0 | 651.0 | 0.885048 | 0.892810 | 0.888962 |
| 1 | macro_average | NaN | NaN | NaN | NaN | NaN | 0.871908 | 0.859606 | 0.865714 |

In [22]:

```
m._ft_model.save_model('./intent-fasttext-2.ftz'); os.path.getsize('./intent-fasttext-2.f
tz')
```

Out[22]:

283423352

Autotune #2

In [18]:

```
def get_fasttext_model_params(m):
    return {
        n: getattr(m, n).name if n == 'loss' else getattr(m, n)
        for n in [
            'lr', 'dim', 'ws', 'epoch', 'minCount', 'minCountLabel',
            'minn', 'maxn', 'neg', 'wordNgrams', 'loss', 'bucket',
            'lrUpdateRate', 't',
        ]
    } def train_fasttext_autotuned(X, y, ppfn=preprocess_fasttext_minimal):
    X_train, X_val, y_train, y_val = train_test_split(
        X, y, test_size=.15, random_state=1337)

with get_fasttext_dataset_path(X_val, y_val) as val_data_path:
        m = FasttextClassifier(preprocess_input=ppfn).fit(
            X_train, y_train,
            autotuneValidationFile=val_data_path,
            autotuneDuration=600,
            # autotuneMetric='precision',
            autotuneModelSize='50M'
        )

return m, get_fasttext_model_params(m._ft_model)

m, best_params = train_fasttext_autotuned(X_train_pp, y_train)
best_params
```

Out[18]:

```
{'lr': 0.1,
 'dim': 100,
 'ws': 5,
 'epoch': 5,
 'minCount': 1,
 'minCountLabel': 0,
 'minn': 0,
 'maxn': 0,
 'neg': 5,
 'wordNgrams': 1,
 'loss': 'softmax',
 'bucket': 0,
 'lrUpdateRate': 100,
 't': 0.0001}
```

In [19]:

```
eval_model(m.inference, X_test_pp, y_test, 'fasttext: tune, quantize, appensum==2')
```

Out[19]:

| | target | total | tps | tns | fps | fns | P | R | F1 |
|---|---|---|---|---|---|---|---|---|---|
| 0 | intent_announce | 340.0 | 253.0 | 17115.0 | 85.0 | 87.0 | 0.748521 | 0.744118 | 0.746313 |
| 1 | intent_apology | 1211.0 | 1061.0 | 16010.0 | 319.0 | 150.0 | 0.768841 | 0.876135 | 0.818989 |
| 2 | intent_ask_help | 1548.0 | 1486.0 | 15822.0 | 170.0 | 62.0 | 0.897343 | 0.959948 | 0.927591 |
| 3 | intent_set_up_meeting | 1676.0 | 1635.0 | 15701.0 | 163.0 | 41.0 | 0.909344 | 0.975537 | 0.941278 |
| 4 | intent_thank | 1304.0 | 1249.0 | 15689.0 | 347.0 | 55.0 | 0.782581 | 0.957822 | 0.861379 |
| 0 | micro_average | 6079.0 | 5684.0 | 80537.0 | 1084.0 | 395.0 | 0.839835 | 0.935022 | 0.884876 |
| 1 | macro_average | NaN | NaN | NaN | NaN | NaN | 0.821326 | 0.902712 | 0.860098 |

Save datasets

In [29]:

pd.concat([X_test, y_test], axis=1).to_csv('../data/intents/first5/test.csv')

In [30]:

pd.concat([X_train, y_train], axis=1).to_csv('../data/intents/first5/train.csv')

APPENDIX 3

(sheets follow)

```
In [115]:

from typing import List, Any, Tuple
import pandas as pd
import numpy as np
import fasttext, sys, os, time if not (oracle_root := os.path.split(os.getcwd())[0]) in sys.path:
    sys.path.append(oracle_root)

from oracle.model.fasttext_wrapper.classifier import FasttextClassifier, FasttextClassifierInference, get_fasttext_dataset_path, from_fasttext_label
from oracle.model.fasttext_wrapper.preprocessing import preprocess_fasttext_full from sklearn.model_selection import train_test_split
from sklearn.metrics import confusion_matrix, plot_confusion_matrix, precision_recall_curve, classification_report, roc_curve
from sklearn.preprocessing import label_binarize from matplotlib import pyplot as plt
import seaborn as sns %matplotlib inline
```

Setup

```
In [3]:

INTENT_NAMES = ['announce', 'apology', 'ask_help', 'set_up_meeting', 'thank']
NEUTRAL_LABEL = 'none'
ALL_LABELS = INTENT_NAMES + [NEUTRAL_LABEL]

In [184]:

class ClfWithThreshold:
    def __init__(self, m, threshold, neutral_label=NEUTRAL_LABEL):
        self.m = m
        self.threshold = threshold
        self.neutral_label = neutral_label
        self.classes_ = m.classes_
        self._estimator_type = m._estimator_type def predict(self, inputs):
        return [
            l if p > self.threshold else self.neutral_label
            for (l, p) in self.m.predict_proba(inputs)]

def conf_mat(m, X_test, y_test, title, normalize=None):
    plot_confusion_matrix(
        m, X_test, y_test,
        labels=ALL_LABELS,
        # set to 'true' to show recall
        # 'pred' shows precision
        # normalize='pred',
        normalize=normalize,
        xticks_rotation='vertical',
        values_format='.0f'
    )
    plt.title(title)
    plt.show()

def eval(m_raw, X_test, y_test, title, normalize=None, threshold=None):
    thresh = threshold if threshold is not None else 0.0 title_with_t = f'{title} (t={threshold})'
    print(f'* {title_with_t} *')
```

```python
m = ClfWithThreshold(m_raw, thresh)

ys = m.predict(X_test)

print(classification_report(y_test, ys))

report = pd.DataFrame(
    classification_report(y_test, ys, output_dict=True,
        labels=INTENT_NAMES))
print(f'''
    min precision\t{report.T['precision'].min()} ({report.columns[report.T['precision'].argmin()]})
    min recall\t{report.T['recall'].min()} ({report.columns[report.T['recall'].argmin()]})
''')

conf_mat(m, X_test, y_test, title_with_t, normalize)

if threshold is None:
    # p/r, roc curves
    assert set(ALL_LABELS) == set(y_test)

y_test_bin = label_binarize(y_test, classes=ALL_LABELS)

ys_bin_probs = np.array([[pd[l] for l in ALL_LABELS]
        for pd in [dict(zip(map(from_fasttext_label, ls), ps))
            for ls, ps in zip(*m_raw.fasttext_model.predict(
                [m_raw._pre_input(x) for x in X_test],
                k=len(ALL_LABELS), threshold=0.0))]])

# precision/recall
    plt.xlabel('recall')
    plt.ylabel('precision')
    plt.title(f'precision/recall, {title}')

ax2 = plt.gca().twinx()
    ax2.set_ylabel('threshold')
    ax2.set_ylim([0, 1])
    ax2.set_xlim([0, 1])

for i, c in enumerate(ALL_LABELS):
        if c != NEUTRAL_LABEL:
            precision, recall, threshs = precision_recall_curve(
                y_test_bin[:, i], ys_bin_probs[:, i])
            p = plt.plot(recall, precision, label=c)
            ax2.plot(recall[:-1], threshs, ':', color=p[-1].get_color())

plt.legend(loc='best')
    plt.show()

# ROC
    plt.xlabel('fp rate')
    plt.ylabel('tp rate')
    plt.title(f'ROC curve, {title}')

ax2 = plt.gca().twinx()
    ax2.set_ylabel('threshold')
    ax2.set_ylim([0, 1])

for i, c in enumerate(ALL_LABELS):
        if c != NEUTRAL_LABEL:
            fpr, tpr, threshs = roc_curve(y_test_bin[:, i], ys_bin_probs[:, i])
            p = plt.plot(fpr, tpr, label=c)
            ax2.plot(fpr, threshs, ':', color=p[-1].get_color())
            ax2.set_xlim([fpr[0], fpr[-1]])

plt.legend(loc='best')
    plt.show()

In [5]:
```

```
def exp(df_train, df_test, train_fn, title):
    X_train, y_train = df_train['sentence'], df_train['label']
    X_test, y_test = df_test['sentence'], df_test['label']

m = train_fn(X_train, y_train)
    eval(m, X_test, y_test, title)

return m
```

In [6]:

```
def mk_err_an_df(X_test, y_test, predss):
    return pd.DataFrame(
        [
            cols for cols in zip(
                X_test,
                *[ps for _, ps in predss],
                y_test
            )
        ],
        columns=['sentence', *[n for n, _ in predss], 'y']
    )
```

Load original datasets

In [7]:

```
orig_train_df = pd.read_csv('../data/intents/first5/train.csv').drop(columns=['Unnamed: 0
']).astype({ 'sentence': 'str' })

orig_test_df = pd.read_csv('../data/intents/first5/test.csv').drop(columns=['Unnamed: 0']
).astype({ 'sentence': 'str' })

orig_train_df['label'].value_counts(), orig_test_df['label'].value_counts()
```

Out[7]:

```
(none             65179
 set_up_meeting    9650
 ask_help          8934
 thank             7222
 apology           6638
 announce          1766
 Name: label, dtype: int64,
 none             11461
 set_up_meeting    1676
 ask_help          1548
 thank             1304
 apology           1211
 announce           340
 Name: label, dtype: int64)
```

Load new neutral datasets

In [8]:

```
new_neutral_random = pd.read_excel('../data/intents/first5/xlsx/new-neutral.xlsx', sheet_
name='Random').astype({ 'sentence': 'str' })
new_neutral_random
```

Out[8]:

| | sentence |
|---|---|
| 0 | It looks like the ▓▓▓▓▓ announcement is now ... |
| 1 | Sorry, this one got away from me... |
| 2 | I'm sorry to be responding so late to this. |

|      | sentence |
| ---: | ---: |
| 3 | Take the evening to talk it over and let me kn... |
| 4 | Please, let me know if you have any other ques... |
| ... | ... |
| 2946 | app messages, and any other internal or extern... |
| 2947 | It also came to the fore that norms were parti... |
| 2948 | ▇▇▇▇ Travelling Height 3.9m x Length 12.4... |
| 2949 | in country |
| 2950 | 00:11:52 |

2951 rows × 1 columns

In [9]:

```
new_neutral_appen = pd.read_excel('../data/intents/first5/alex/new-neutral.xlsx', sheet_n
ame='Appen').astype({ 'sentence': 'str' })
new_neutral_appen
```

Out[9]:

|      | sentence |
| ---: | ---: |
| 0 | Please let me know if you will be able to attend. |
| 1 | If anything comes up for me between now and ne... |
| 2 | I understand your concern and apologies for th... |
| 3 | if you're still interested please give me a ca... |
| 4 | Will you send me something in in advance of ou... |
| ... | ... |
| 4491 | caused." |
| 4492 | I knew most of this. |
| 4493 | ▇▇▇▇ and Manufacturing a lot |
| 4494 | Visitor:▇▇▇▇ |
| 4495 | ▇▇▇▇ |

4496 rows × 1 columns

Train/test split for new neutral datasets

In [10]:

```
new_neutral_appen_train, new_neutral_appen_test = train_test_split(
    new_neutral_appen, test_size=.15, random_state=1337
)

new_neutral_random_train, new_neutral_random_test = train_test_split(
    new_neutral_random, test_size=.15, random_state=1337
)

len(new_neutral_appen_train), len(new_neutral_appen_test), len(new_neutral_random_train),
len(new_neutral_random_test)
```

Out[10]:

(3821, 675, 2508, 443)

Eval current model

In [16]:

```
current_model = FasttextClassifierInference(
```

```
current_model = FastTextClassifierInference(
    fasttext.load_model('../data/model/fasttext-intent5.ftz'), preprocess_input=preproces
s_fasttext_full)
```

Warning : `load_model` does not return WordVectorModel or SupervisedModel any more, but a
`FastText` object which is very similar.

In [17]:

```
# sanity check: use original test set
eval(current_model,
    orig_test_df['sentence'],
    orig_test_df['label'],
    'original model, original test set')
```

* original model, original test set *
```
                precision    recall  f1-score   support announce       0.83      0.72      0.77       340
       apology       0.84      0.79      0.81      1211
      ask_help       0.93      0.94      0.94      1548
          none       0.94      0.94      0.94     11461
 set_up_meeting       0.92      0.94      0.93      1676
         thank       0.86      0.87      0.86      1304 accuracy                           0.92     17540
     macro avg       0.89      0.87      0.88     17540
  weighted avg       0.92      0.92      0.92     17540 min precision 0.8299319727891157 (announce)
min recall 0.7176470588235294 (announce)
```

Current model vs new test sets

In [11]:

```
def mk_new_df(orig_df, neutral_dfs):
    return pd.concat([
        orig_df[orig_df['label'] != 'none'],
        *(n.assign(label='none') for n in neutral_dfs)
    ], ignore_index=True).astype({ 'sentence': 'str', 'label': 'str' }).sample(frac=1, r
andom_state=1337)

assert mk_new_df(orig_test_df, [new_neutral_random])['label'].value_counts()['none'] ==
len(new_neutral_random)
```

In [234]:

```
eval(
    current_model,
    (_df := mk_new_df(orig_test_df, [new_neutral_random_test]))['sentence'],
    _df['label'],
    'original model, new (random only) test set')
```

* original model, new (random only) test set *
```
                precision    recall  f1-score   support announce       1.00      0.72      0.84       340
       apology       1.00      0.79      0.88      1211
      ask_help       1.00      0.94      0.97      1548
          none       0.38      0.98      0.55       443
 set_up_meeting       0.99      0.94      0.97      1676
         thank       0.99      0.87      0.93      1304 accuracy                           0.89      6522
     macro avg       0.89      0.87      0.86      6522
  weighted avg       0.95      0.89      0.91      6522
```

```
min precision 0.9937146448774355 (set_up_meeting)
min recall 0.7176470588235294 (announce)
```

In [235]:

```
eval(
    current_model,
    (_df := mk_new_df(orig_test_df, [new_neutral_appen_test]))['sentence'],
    _df['label'],
    'original model, new (appen only) test set')
```

* original model, new (appen only) test set *

|  | precision | recall | f1-score | support |
|---|---|---|---|---|
| announce | 0.93 | 0.72 | 0.81 | 340 |
| apology | 0.98 | 0.79 | 0.88 | 1211 |
| ask_help | 1.00 | 0.94 | 0.97 | 1548 |
| none | 0.46 | 0.90 | 0.61 | 675 |
| set_up_meeting | 0.98 | 0.94 | 0.96 | 1676 |
| thank | 0.99 | 0.87 | 0.93 | 1304 |
| accuracy |  |  | 0.88 | 6754 |
| macro avg | 0.89 | 0.86 | 0.86 | 6754 |
| weighted avg | 0.93 | 0.88 | 0.90 | 6754 |

```
min precision 0.9348659003831419 (announce)
min recall 0.7176470588235294 (announce)
```

In [236]:

```
eval(
    current_model,
    (_df := mk_new_df(orig_test_df,
        [new_neutral_random_test, new_neutral_appen_test]))['sentence'],
    _df['label'],
    'original model, new (random+appen) test set')
```

* original model, new (random+appen) test set *

|  | precision | recall | f1-score | support |
|---|---|---|---|---|
| announce | 0.93 | 0.72 | 0.81 | 340 |
| apology | 0.98 | 0.79 | 0.88 | 1211 |
| ask_help | 1.00 | 0.94 | 0.97 | 1548 |
| none | 0.60 | 0.93 | 0.73 | 1118 |
| set_up_meeting | 0.97 | 0.94 | 0.96 | 1676 |
| thank | 0.99 | 0.87 | 0.93 | 1304 |
| accuracy |  |  | 0.89 | 7197 |
| macro avg | 0.91 | 0.86 | 0.88 | 7197 |
| weighted avg | 0.92 | 0.89 | 0.90 | 7197 |

```
min precision 0.9348659003831418 (announce)
min recall 0.7176470588235294 (announce)
```

Train with new data

In [12]:

```
def train(X_train, y_train, train_args):
    m = FasttextClassifier(preprocess_input=preprocess_fasttext_full)
    m.fit(X_train, y_train, **train_args)
    return m.inference
```

In [187]:

```
best_train_args = {
    'lr': 0.5749665254632529,
    'dim': 81,
    'ws': 5,
    'epoch': 50,
    'minCount': 1,
    'minCountLabel': 0,
    'minn': 2,
    'maxn': 5,
    'neg': 5,
    'wordNgrams': 3,
    'loss': 'softmax',
    'bucket': 1337371,
    'lrUpdateRate': 100,
    't': 0.0001
}
```

In [237]:

```
exp(
    mk_new_df(orig_train_df, [new_neutral_random_train]),
    mk_new_df(orig_test_df, [new_neutral_random_test, new_neutral_appen_test]),
    lambda X_train, y_train: train(X_train, y_train, best_train_args),
    'new model, random only train, random+appen eval')
```

\*\*\* new model, random only train, random+appen eval \*\*\*

|                | precision | recall | f1-score | support |
|---|---|---|---|---|
| announce       | 0.52 | 0.97 | 0.67 | 340 |
| apology        | 0.90 | 0.99 | 0.94 | 1211 |
| ask_help       | 0.99 | 1.00 | 0.99 | 1548 |
| none           | 0.95 | 0.45 | 0.61 | 1118 |
| set_up_meeting | 0.94 | 0.99 | 0.96 | 1676 |
| thank          | 0.96 | 1.00 | 0.98 | 1304 |
|                |      |      |      |      |
| accuracy       |      |      | 0.91 | 7197 |
| macro avg      | 0.87 | 0.90 | 0.86 | 7197 |
| weighted avg   | 0.93 | 0.91 | 0.90 | 7197 | min precision 0.515625 (announce)
min recall 0.9705882352941176 (announce)

Out[237]:

<oracle.model.fasttext_wrapper.classifier.FasttextClassifierInference at 0x7fdd21541f40>

In [238]:

```
exp(
    mk_new_df(orig_train_df, [new_neutral_appen_train]),
    mk_new_df(orig_test_df, [new_neutral_random_test, new_neutral_appen_test]),
    lambda X_train, y_train: train(X_train, y_train, best_train_args),
    'new model, appen only train, random+appen eval')
```

\*\*\* new model, appen only train, random+appen eval \*\*\*

|                | precision | recall | f1-score | support |
|---|---|---|---|---|
| announce | 0.74 | 0.78 | 0.76 | 340 |
| apology  | 0.94 | 0.95 | 0.94 | 1211 |
| ask_help | 0.99 | 1.00 | 0.99 | 1548 |
| none     | 0.81 | 0.73 | 0.77 | 1118 |

```
set_up_meeting    0.94    0.97    0.93    1676
        thank     0.97    0.99    0.98    1304 accuracy                     0.93    7197
    macro avg     0.90    0.90    0.90    7197
 weighted avg     0.93    0.93    0.93    7197 min precision 0.7436619718309859 (announce)
   min recall 0.7764705882352941 (announce)
```

Out[238]:

<oracle.model.fasttext_wrapper.classifier.FasttextClassifierInference at 0x7fdcd0ced5b0>

In [239]:

```
m = exp(
    mk_new_df(orig_train_df, [new_neutral_random_train, new_neutral_appen_train]),
    mk_new_df(orig_test_df, [new_neutral_random_test, new_neutral_appen_test]),
    lambda X_train, y_train: train(X_train, y_train, best_train_args),
    'new model, random+appen train, random+appen eval')

*** new model, random+appen train, random+appen eval ***
              precision    recall   f1-score   support announce     0.81       0.76      0.79       340
     apology     0.94       0.94      0.94      1211
    ask_help     0.99       1.00      0.99      1548
        none     0.80       0.79      0.80      1118
set_up_meeting   0.95       0.97      0.96      1676
       thank     0.98       0.99      0.98      1304 accuracy                          0.93      7197
   macro avg     0.91       0.91      0.91      7197
weighted avg     0.93       0.93      0.93      7197 min precision 0.8074534161490683 (announce)
   min recall 0.7647058823529411 (announce)
```

In [200]:

```
mk_new_df(orig_train_df, [new_neutral_random_train, new_neutral_appen_train])['label'].va
lue_counts()
```

Out[200]:

```
set_up_meeting    9650
ask_help          8934
thank             7222
apology           6638
none              6329
announce          1766
Name: label, dtype: int64
```

Error analysis

In [203]:

```
mk_err_an_df(
    (_X_test := (_df := mk_new_df(orig_test_df,
        [new_neutral_random_test, new_neutral_appen_test]))['sentence']),
    _df['label'],
    [('model', m.predict(_X_test))]).to_csv('./new_model_error_analysis_2.csv')
```

Save new datasets

In [20]:

```
new_train_df = mk_new_df(
    orig_train_df,
    [new_neutral_random_train, new_neutral_appen_train])

new_test_df = mk_new_df(
    orig_test_df,
    [new_neutral_random_test, new_neutral_appen_test])

new_train_df['label'].value_counts(), new_test_df['label'].value_counts()
```

Out[20]:

```
(set_up_meeting    9650
 ask_help          8934
 thank             7222
 apology           6638
 none              6329
 announce          1766
 Name: label, dtype: int64,
 set_up_meeting    1676
 ask_help          1548
 thank             1304
 apology           1211
 none              1118
 announce           340
 Name: label, dtype: int64)
```

In [210]:

```
new_train_df.to_csv('../data/intents/first5/train2.csv')
new_test_df.to_csv('../data/intents/first5/test2.csv')
```

In [214]:

```
pd.read_csv('../data/intents/first5/train2.csv')['label'].value_counts(), pd.read_csv('../data/intents/first5/test2.csv')['label'].value_counts(),
```

Out[214]:

```
(set_up_meeting    9650
 ask_help          8934
 thank             7222
 apology           6638
 none              6329
 announce          1766
 Name: label, dtype: int64,
 set_up_meeting    1676
 ask_help          1548
 thank             1304
 apology           1211
 none              1118
 announce           340
 Name: label, dtype: int64)
```

Quantize and save model

In [216]:

```
eval(m, new_test_df['sentence'], new_test_df['label'], 'new model before quantization')
```

| | precision | recall | f1-score | support |
|---|---|---|---|---|
| announce | 0.81 | 0.77 | 0.79 | 340 |
| apology | 0.94 | 0.94 | 0.94 | 1211 |
| ask_help | 0.99 | 1.00 | 1.00 | 1548 |
| none | 0.81 | 0.79 | 0.80 | 1118 |

|               | precision | recall | f1-score | support |
|---------------|-----------|--------|----------|---------|
| set_up_meeting | 0.95     | 0.97   | 0.96     | 1676    |
| thank         | 0.98      | 0.99   | 0.98     | 1304    |
|               |           |        |          |         |
| accuracy      |           |        | 0.94     | 7197    |
| macro avg     | 0.91      | 0.91   | 0.91     | 7197    |
| weighted avg  | 0.93      | 0.94   | 0.93     | 7197    |

In [14]:

```
best_quantize_args = dict(cutoff=60000)
```

In [240]:

```
m.fasttext_model.quantize(**best_quantize_args)
```

In [241]:

```
eval(m, new_test_df['sentence'], new_test_df['label'], 'new model after quantization')
```

* new model after quantization *

|               | precision | recall | f1-score | support |
|---------------|-----------|--------|----------|---------|
| announce      | 0.81      | 0.77   | 0.79     | 340     |
| apology       | 0.94      | 0.94   | 0.94     | 1211    |
| ask_help      | 0.99      | 1.00   | 0.99     | 1548    |
| none          | 0.80      | 0.79   | 0.80     | 1118    |
| set_up_meeting | 0.96     | 0.96   | 0.96     | 1676    |
| thank         | 0.97      | 0.99   | 0.98     | 1304    |
|               |           |        |          |         |
| accuracy      |           |        | 0.93     | 7197    |
| macro avg     | 0.91      | 0.91   | 0.91     | 7197    |
| weighted avg  | 0.93      | 0.93   | 0.93     | 7197    |

```
min precision 0.8061538461538461 (announce)
min recall 0.7705882352941177 (announce)
```

In [221]:

```
m.fasttext_model.save_model(
    f'../data/model/fasttext-intent5-{time.time_ns() // 1000}.ftz'
)
```

Precision/recall trade-off

In [76]:

```
new_train_df, new_test_df = [
    pd.read_csv(p, dtype={'sentence': str, 'label': str}, na_filter=False)
    for p in ['../data/intents/first5/train2.csv', '../data/intents/first5/test2.csv']]
```

In [169]:

```
eval(
    FasttextClassifierInference(
        fasttext.load_model('../data/model/fasttext-intent5-new.ftz'),
        preprocess_input=preprocess_fasttext_full),
    new_test_df['sentence'], new_test_df['label'], 'new model after quantization',
    threshold=0.9)
```

Warning : `load_model` does not return WordVectorModel or SupervisedModel any more, but a `FastText` object which is very similar.
* new model after quantization (t=0.9) *
            precision    recall  f1-score   support

```
              precision    recall   f1-score   support announce       0.86      0.69      0.77       340
     apology       0.95      0.90      0.92      1211
    ask_help       1.00      0.99      0.99      1548
        none       0.72      0.84      0.78      1118
set_up_meeting     0.96      0.94      0.95      1676
       thank       0.98      0.98      0.98      1304 accuracy                           0.92      7197
   macro avg       0.91      0.89      0.90      7197
weighted avg       0.93      0.92      0.92      7197 min precision 0.8613138686131386 (announce)
min recall 0.6941176470588235 (announce)
```

In [174]:

```
eval(
    FasttextClassifierInference(
        fasttext.load_model('../data/model/fasttext-intent5.ftz'),
        preprocess_input=preprocess_fasttext_full),
    new_test_df['sentence'], new_test_df['label'], 'old model',
    threshold=0.0)
```

Warning : `load_model` does not return WordVectorModel or SupervisedModel any more, but a `FastText` object which is very similar.
* old model (t=0.0) *

```
              precision    recall   f1-score   support announce       0.93      0.72      0.81       340
     apology       0.98      0.79      0.88      1211
    ask_help       1.00      0.94      0.97      1548
        none       0.60      0.93      0.73      1118
set_up_meeting     0.97      0.94      0.96      1676
       thank       0.99      0.87      0.93      1304 accuracy                           0.89      7197
   macro avg       0.91      0.86      0.88      7197
weighted avg       0.92      0.89      0.90      7197 min precision 0.9348659003831418 (announce)
min recall 0.7176470588235294 (announce)
```

Pick the right threshold

In [226]:

```
eval(
    FasttextClassifierInference(
        fasttext.load_model('../data/model/fasttext-intent5-new.ftz'),
        preprocess_input=preprocess_fasttext_full),
    new_test_df['sentence'], new_test_df['label'], 'new model after quantization',
    threshold=0.5)
```

Warning : `load_model` does not return WordVectorModel or SupervisedModel any more, but a Warning : `load_model` does not return WordVectorModel or SupervisedModel any more, but a `FastText` object which is very similar.
* new model after quantization (t=0.5) *

```
                 precision    recall  f1-score   support announce       0.80      0.76      0.78       340
       apology       0.93      0.95      0.94      1211
      ask_help       0.99      1.00      1.00      1548
          none       0.82      0.77      0.79      1118
 set_up_meeting      0.95      0.97      0.96      1676
         thank       0.97      0.99      0.98      1304 accuracy                           0.93      7197
     macro avg       0.91      0.91      0.91      7197
  weighted avg       0.93      0.93      0.93      7197 min precision 0.7975460122699386 (announce)
    min recall 0.7647058823529411 (announce)
```

In [186]:

```
eval(
    FasttextClassifierInference(
        fasttext.load_model('../data/model/fasttext-intent5.ftz'),
        preprocess_input=preprocess_fasttext_full),
    new_test_df['sentence'], new_test_df['label'], 'old model',
    threshold=0.15)
```

Warning : `load_model` does not return WordVectorModel or SupervisedModel any more, but a `FastText` object which is very similar.
* old model (t=0.15) *

```
                 precision    recall  f1-score   support announce       0.93      0.72      0.81       340
       apology       0.98      0.79      0.88      1211
      ask_help       1.00      0.94      0.97      1548
          none       0.60      0.93      0.73      1118
 set_up_meeting      0.97      0.94      0.96      1676
         thank       0.99      0.87      0.93      1304 accuracy                           0.89      7197
     macro avg       0.91      0.86      0.88      7197
  weighted avg       0.92      0.89      0.90      7197 min precision 0.9348659003831418 (announce)
    min recall 0.7176470588235294 (announce)
```

Training dataset size vs eval results

In [205]:

```
def perf_vs_training_samples(X_train, y_train, X_test, y_test):
    eval_rs = []

for ratio_ in range(3, 101, 3):
        ratio = ratio_ / 100.0

X_tr = X_train.sample(frac=ratio, random_state=1337)
        y_tr = y_train[X_tr.index]

print(f'training with {len(X_tr)} samples')
```

```
m = FasttextClassifier(preprocess_input=preprocess_fasttext_full).fit(
    X_tr.to_list(), y_tr.to_list(),
    **best_train_args)

# m = ClfWithThreshold(m_raw, thresh)
ys = m.inference.predict(X_test)

eval_r = classification_report(y_test, ys, output_dict=True,
    labels=ALL_LABELS)

eval_rs.append({
    'ratio': ratio,
    'total_samples': len(X_tr),
    **eval_r
})

return pd.DataFrame(eval_rs)

r = perf_vs_training_samples(
    new_train_df['sentence'],
    new_train_df['label'],
    new_test_df['sentence'],
    new_test_df['label']
)

training with 1216 samples
training with 2432 samples
training with 3649 samples
training with 4865 samples
training with 6081 samples
training with 7297 samples
training with 8513 samples
training with 9729 samples
training with 10946 samples
training with 12162 samples
training with 13378 samples
training with 14594 samples
training with 15810 samples
training with 17026 samples
training with 18243 samples
training with 19459 samples
training with 20675 samples
training with 21891 samples
training with 23107 samples
training with 24323 samples
training with 25540 samples
training with 26756 samples
training with 27972 samples
training with 29188 samples
training with 30404 samples
training with 31620 samples
training with 32837 samples
training with 34053 samples
training with 35269 samples
training with 36485 samples
training with 37701 samples
training with 38917 samples
training with 40134 samples
```

In [207]:

```
r.to_pickle('./training-set-size-eval-2020-09-22.pkl')
```

In [212]:

```
for metric in ['precision', 'recall', 'f1-score']:
    plt.plot(r['total_samples'], [m[metric] for m in r['macro avg']], label=metric)

plt.xlabel('training samples')
plt.ylabel('macro avg')
plt.legend(loc='best')
```

```
plt.title('macro avg metrics vs training set size')
```

Out[212]:

Text(0.5, 1.0, 'macro avg metrics vs training set size')

In [213]:

```
for label in INTENT_NAMES:
    plt.plot(r['total_samples'], [m['precision'] for m in r[label]], label=label)

plt.xlabel('training samples')
plt.ylabel('precision')
plt.legend(loc='best')
plt.title('precision vs training set size')
```

Out[213]:

Text(0.5, 1.0, 'precision vs training set size')

In [214]:

```
for label in INTENT_NAMES:
    plt.plot(r['total_samples'], [m['recall'] for m in r[label]], label=label)

plt.xlabel('training samples')
plt.ylabel('recall')
plt.legend(loc='best')
plt.title('recall vs training set size')
```

Out[214]:

Text(0.5, 1.0, 'recall vs training set size')

In [ ]:

APPENDIX 1

(sheets follow)

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed at a first computer and comprising:
    programmatically receiving a digital electronic object comprising a source text;
    dividing the source text into a plurality of source text units;
    evaluating each particular source text unit among the plurality of source text units using a machine learning model, and receiving a classification output from the machine learning model that classifies each particular source text unit as a particular class of phrase among a plurality of possible classes of phrases;
    transforming the classification output to yield an output set of phrase suggestions;
    transmitting the output set of phrase suggestions to a second computer as a selectable hyperlink;
    wherein the plurality of possible classes of phrases are each label values representing a type of intent represented in the particular source text unit, wherein the output set of phrase suggestions is associated with a particular label value, and wherein the transforming the classification output comprises mapping the classification output to a plurality of candidate phrase suggestions in a digital database, to yield an initial set of matching phrase suggestions, grouping similar phrase suggestions from the initial set of matching phrase suggestions by executing a clustering algorithm to produce a number of clusters, ranking each candidate phrase suggestion of the initial set of matching phrase suggestions, determining in each cluster which candidate phrase suggestion in each cluster has a highest rank; and selecting from each cluster, the candidate phrase suggestion which has the highest rank to yield the output set of phrase suggestions;
    wherein the selectable hyperlink when selected causes the first computer to delete the particular source text unit in the digital electronic object and insert a selected output phrase suggestion corresponding to the selectable hyperlink.

2. The computer-implemented method of claim 1, the plurality of source text units comprising a plurality of sentences of the source text.

3. The computer-implemented method of claim 1, the plurality of source text units comprising a plurality of sentences of the source text, the method further comprising executing the dividing using a computer-implemented parser.

4. The computer-implemented method of claim 1, the machine learning model comprising a trained multi-class text classifier comprising a FASTTEXT classifier.

5. The computer-implemented method of claim 1, wherein each candidate phrase suggestion is ranked in order of least similarity to the particular source text unit.

6. The computer-implemented method of claim 1, the machine learning model comprising any of:
    a plurality of text classifiers coupled as an ensemble;
    a plurality of targeted rules that are programmed to find relevant words and coupled to a classifier to approve or reject whether an instance of a word is correct.

7. The computer-implemented method of claim 1, further comprising:
    the first computer executing a text processor that is communicatively coupled to a text processing extension that is executed at the second computer;
    programmatically receiving the digital electronic object comprising the source text via a message initiated at the text processing extension and transmitted to the text processor;
    the text processing extension executing in association with an application program that is executing at the second computer, the text processing extension being programmed to automatically detect a change in a text entry window of the application program and, in response, to initiate the message.

8. The computer-implemented method of claim 1, further comprising:
    the first computer executing a text processor that is communicatively coupled to a text processing extension that is executed at the second computer;
    programmatically receiving the digital electronic object comprising the source text via a message initiated at the text processing extension and transmitted to the text processor;
    the text processor executing in association with a browser that is executing at the second computer, the text processing extension being programmed to automatically detect a change in a text entry widget of the browser and, in response, to initiate the message.

9. The computer-implemented method of claim 1, the machine learning model being trained to classify each particular source text unit as a particular class of phrase from among: thank, happy birthday, ask for help, decline invitation, follow up, congratulate, introduce, apology, announcement, setting up a meeting.

10. One or more non-transitory computer-readable media storing one or more sequences of instructions which, when executed using a first computer, cause the first computer to execute:
    programmatically receiving a digital electronic object comprising a source text;
    dividing the source text into a plurality of source text units;
    evaluating each particular source text unit among the plurality of source text units using a trained multi-class text classifier machine learning model, and receiving a classification output from the trained multi-class text classifier machine learning model that classifies each particular source text unit as a particular class of phrase among a plurality of possible classes of phrases;
    mapping the classification output to a plurality of candidate phrase suggestions in a digital database, to yield an initial set of matching phrase suggestions;
    grouping similar phrase suggestions from the initial set of matching phrase suggestions by executing a clustering algorithm to produce a number of clusters;
    ranking each candidate phrase suggestion of the initial set of matching phrase suggestions;

determining in each cluster which candidate phrase suggestion in each cluster has a highest rank;

selecting from each cluster, a selected candidate phrase suggestion which has the highest rank to yield an output set of phrase suggestions;

transmitting the output set of phrase suggestions to a second computer as a selectable hyperlink;

wherein the plurality of possible classes of phrases are each label values representing a type of intent represented in the source text units;

wherein the output set of phrase suggestions is associated with a particular label value;

wherein the selectable hyperlink when selected causes the first computer to delete the particular source text unit in the digital electronic object and insert a selected output phrase suggestion corresponding to the selectable hyperlink.

11. The one or more computer-readable media of claim 10, the plurality of source text units comprising a plurality of sentences of the source text.

12. The one or more computer-readable media of claim 10, the plurality of source text units comprising a plurality of sentences of the source text, the one or more computer-readable media further comprising sequences of instructions which when executed by the first computer cause executing the dividing using a computer-implemented parser.

13. The one or more computer-readable media of claim 10, the trained multi-class text classifier comprising a FASTTEXT classifier using FASTTEXT embeddings as a metric of semantic distance between training sentences and the source text units.

14. The one or more computer-readable media of claim 10, wherein each candidate phrase suggestion is ranked in order of least similarity to the particular source text unit.

15. The one or more computer-readable media of claim 10, further comprising sequences of instructions which when executed by the first computer cause:

the first computer executing a text processor that is communicatively coupled to a text processing extension that is executed at the second computer;

programmatically receiving the digital electronic object comprising the source text via a message initiated at the text processing extension and transmitted to the text processor.

16. The one or more computer-readable media of claim 15, the text processing extension executing in association with an application program that is executing at the second computer, the text processing extension being programmed to automatically detect a change in a text entry window of the application program and, in response, to initiate the message.

17. The one or more computer-readable media of claim 15, the text processor executing in association with browser that is executing at the second computer, the text processing extension being programmed to automatically detect a change in a text entry widget of the browser and, in response, to initiate the message.

18. The one or more computer-readable media of claim 10, the trained multi-class text classifier machine learning model being trained to classify each particular source text unit as a particular class of phrase from among: thank, happy birthday, ask for help, decline invitation, follow up, congratulate, introduce, apology, announcement, setting up a meeting.

19. A text processing device, comprising:

one or more central processing units;

one or more network interfaces that are configured to communicatively couple the one or more central processing units to a data communication network;

electronic digital random access memory storing a plurality of sequences of stored program instructions that are organized as executable checks for checking a digitally stored source text that is received via the data communication network from a computing device that is executing a text processing extension, a phrase check among the executable checks comprising multi-class text classifier instructions coupled to phrase suggestion instructions, the phrase suggestion instructions being coupled to a digital phrase store;

the multi-class text classifier instructions and phrase suggestion instructions being programmed to:

read the stored source text;

identify a plurality of sentences in the stored source text;

for each particular sentence in the plurality of sentences, evaluate the particular sentence using a machine learning model that has been trained using a training dataset of a plurality of similar sentences that express a similar intent, and to output a classification output;

map the classification output to the digital phrase store, to select an initial set of matching phrase suggestions;

group similar phrase suggestions from the initial set of matching phrase suggestions by executing a clustering algorithm to produce a number of clusters;

rank each candidate phrase suggestion of the initial set of matching phrase suggestions;

determine in each cluster which candidate phrase suggestion in each cluster has a highest rank;

select from each cluster, the candidate phrase suggestion which has the highest rank to yield an output set of phrase suggestions;

transmit the output set of phrase suggestions as a selectable hyperlink to the computing device via the data communication network;

wherein the classification output comprises label values representing a type of intent represented in the plurality of similar sentences;

wherein the initial set of matching phrase suggestions are associated with a particular label value;

wherein the selectable hyperlink when selected causes the computing device to delete the particular sentence in the stored source text and insert a selected output phrase suggestion corresponding to the selectable hyperlink.

20. The text processing device of claim 19, wherein each candidate phrase suggestion is ranked in order of least similarity of each of the matching phrase suggestions to the particular sentence, and the output set of phrase suggestions is filtered to retain only a specified number of least similar matching phrase suggestions.

21. The text processing device of claim 20, the specified number being in a range of three to ten.

* * * * *